US012603807B2

(12) United States Patent
Zhang

(10) Patent No.: US 12,603,807 B2
(45) Date of Patent: Apr. 14, 2026

(54) DATA PROCESSING METHOD AND DEVICE FOR FRAME SYNCHRONIZATION, AND COMMUNICATION SYSTEM AND COMMUNICATION DEVICE

(71) Applicant: AUCTUS TECHNOLOGY CO., LTD., Shenzhen (CN)

(72) Inventor: Wei Zhang, Shenzhen (CN)

(73) Assignee: AUCTUS TECHNOLOGY CO., LTD., Shenzhen (CN)

( * ) Notice: Subject to any disclaimer, the term of this patent is extended or adjusted under 35 U.S.C. 154(b) by 136 days.

(21) Appl. No.: 18/562,165

(22) PCT Filed: Dec. 17, 2021

(86) PCT No.: PCT/CN2021/139324

§ 371 (c)(1),
(2) Date: Nov. 17, 2023

(87) PCT Pub. No.: WO2022/242157

PCT Pub. Date: Nov. 24, 2022

(65) Prior Publication Data

US 2024/0283690 A1     Aug. 22, 2024

(30) Foreign Application Priority Data

May 18, 2021   (CN) ......................... 202110541467.7

(51) Int. Cl.
*H04L 27/26*          (2006.01)
*H04L 5/00*           (2006.01)
*H04W 56/00*          (2009.01)

(52) U.S. Cl.
CPC ........ *H04L 27/2656* (2013.01); *H04L 5/0053* (2013.01); *H04W 56/002* (2013.01)

(58) Field of Classification Search
CPC ............. H04W 76/45; H04W 56/0085; H04W 56/002; H04W 56/0025; H04W 72/0446;
(Continued)

(56) References Cited

U.S. PATENT DOCUMENTS

| 6,002,710 | A | 12/1999 | Hendrickson et al. |
| 2004/0240465 | A1* | 12/2004 | Newberg ............. H04B 7/2643 |
| | | | 370/442 |

(Continued)

FOREIGN PATENT DOCUMENTS

| CN | 1118195 | C | 8/2003 |
| CN | 102118191 | A | 7/2011 |

(Continued)

OTHER PUBLICATIONS

International Search Report and Written Opinion of corresponding PCT application No. PCT/CN2021/139324 mailed Apr. 4, 2022 (13 pages).

(Continued)

*Primary Examiner* — Aristocratis Fotakis
(74) *Attorney, Agent, or Firm* — Crowell & Moring LLP

(57)          ABSTRACT

The present application relates to a data processing method and device for frame synchronization, a communication system, a communication device, a communication apparatus and a storage medium. The method includes: processing frame parameter information to generate a frame parameter field with a set pattern; packing the frame parameter field with payload data to obtain frame structure data; and sending the frame structure data, wherein the set pattern is used by a receiving end to position the frame parameter field in a received data stream, and subsequently to obtain the frame structure data from the data stream based on the frame parameter field. The above method enables the receiving end to determine the start position of the data frame sent from the (Continued)

sending end without using the synchronization word in the communication system, which improves the efficiency of data transmission in the communication system.

23 Claims, 12 Drawing Sheets

(58) Field of Classification Search
CPC . H04L 5/0053; H04L 27/2656; H04B 7/2656; H04B 7/2643
See application file for complete search history.

(56) References Cited

U.S. PATENT DOCUMENTS

| | | | | |
|---|---|---|---|---|
| 2008/0008153 A1* | 1/2008 | Hiben | .................... | H04J 3/0605 370/344 |
| 2008/0285591 A1 | 11/2008 | Kim et al. | | |
| 2009/0323878 A1* | 12/2009 | Konishi | .................. | H04L 7/042 375/365 |
| 2011/0058528 A1* | 3/2011 | Chang | ................. | H04L 27/2614 370/330 |
| 2012/0163377 A1* | 6/2012 | Khoo | .................... | H04W 76/45 370/389 |
| 2016/0218834 A1* | 7/2016 | Bohn | ................ | H04W 56/0015 |
| 2019/0124596 A1* | 4/2019 | Cao | ...................... | H04L 5/0053 |
| 2019/0239253 A1 | 8/2019 | Tomeba et al. | | |

FOREIGN PATENT DOCUMENTS

| | | |
|---|---|---|
| CN | 104363192 A | 2/2015 |
| CN | 106559902 A | 4/2017 |
| CN | 109309552 A | 2/2019 |
| CN | 110166276 A | 8/2019 |
| CN | 110166849 A | 8/2019 |
| CN | 110311747 A | 10/2019 |
| CN | 112118199 A | 12/2020 |
| JP | 2009153183 A | 7/2009 |
| WO | WO2018049924 A1 | 3/2018 |

OTHER PUBLICATIONS

Office Action of corresponding CN application No. 202110541467.7 dated Sep. 2, 2022, including English translation (16 pages).
Notification to Grant Patent Right for Invention for CN priority application 202110541467.7 dated Nov. 11, 2022 including English translation (10 pages).

* cited by examiner

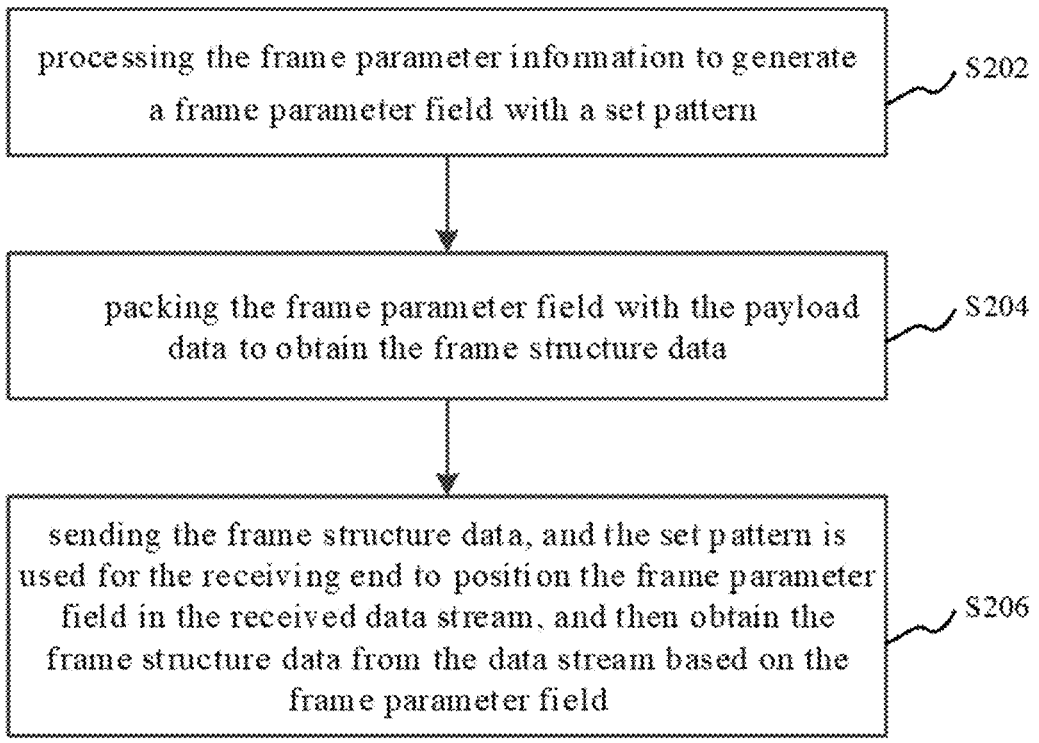

processing the frame parameter information to generate a frame parameter field with a set pattern ⟋ S202 packing the frame parameter field with the payload data to obtain the frame structure data ⟋ S204 sending the frame structure data, and the set pattern is used for the receiving end to position the frame parameter field in the received data stream, and then obtain the frame structure data from the data stream based on the frame parameter field ⟋ S206

FIG. 2

| payload data | frame parameter field | payload data |
|--------------|----------------------|--------------|

FIG. 3

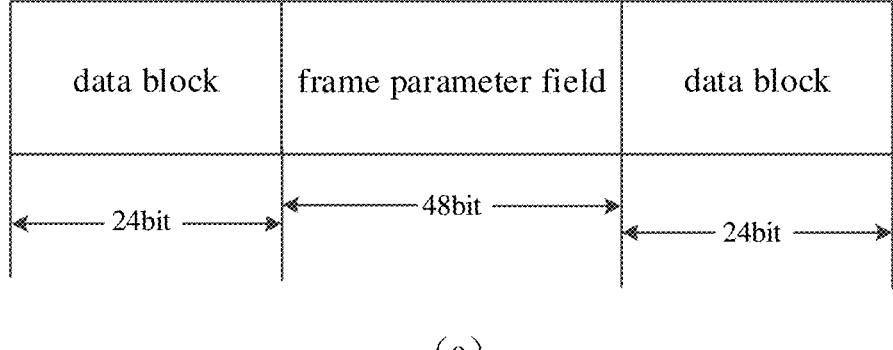
(a)
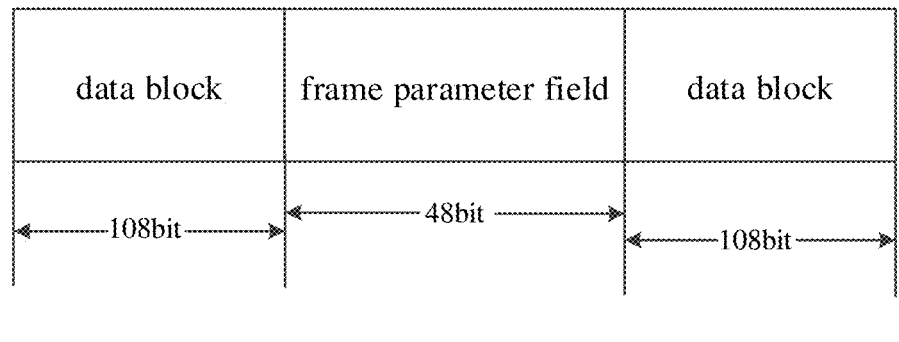
(b)
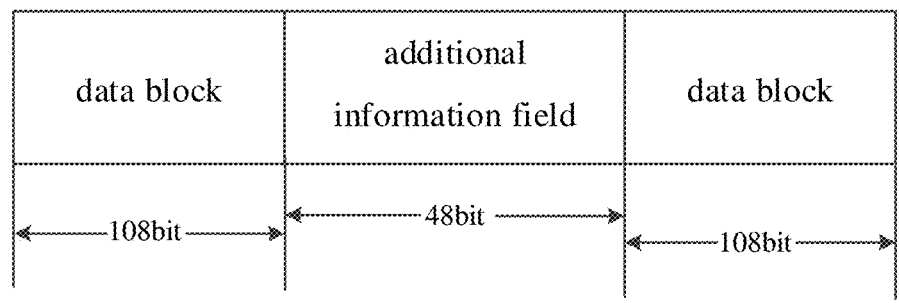
(c)
FIG. 4

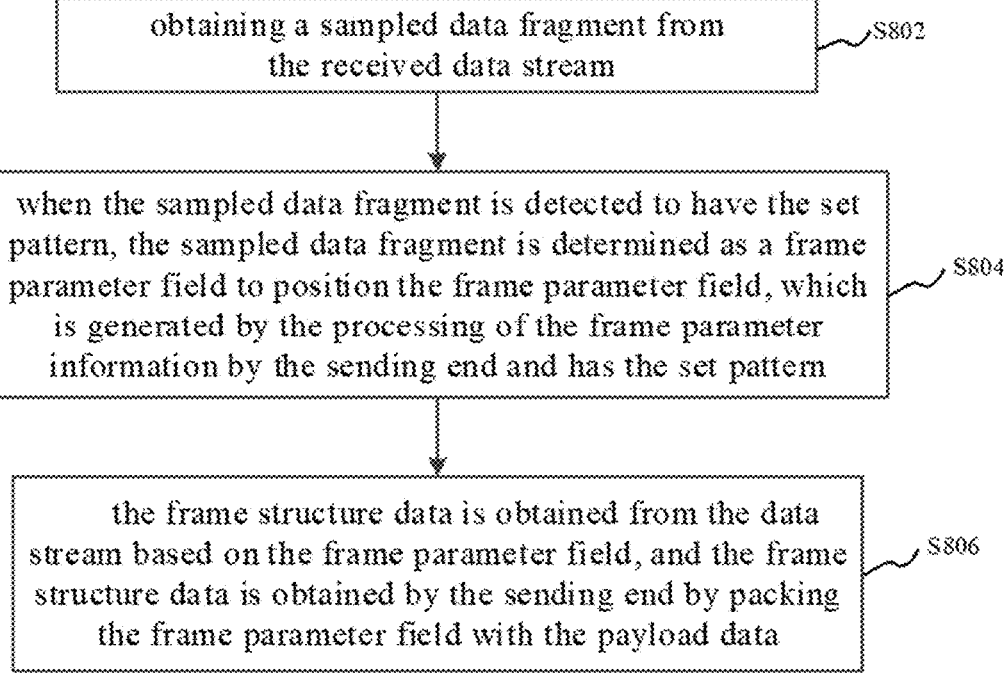

obtaining a sampled data fragment from
the received data stream                                    S802 when the sampled data fragment is detected to have the set
pattern, the sampled data fragment is determined as a frame
parameter field to position the frame parameter field, which      S804
is generated by the processing of the frame parameter
information by the sending end and has the set pattern the frame structure data is obtained from the data
stream based on the frame parameter field, and the frame      S806
structure data is obtained by the sending end by packing
the frame parameter field with the payload data

FIG. 8

| payload data | frame parameter field | payload data |
|:---:|:---:|:---:|

$\longleftarrow$ 48 bit $\longrightarrow$

FIG. 10

DATA PROCESSING METHOD AND DEVICE FOR FRAME SYNCHRONIZATION, AND COMMUNICATION SYSTEM AND COMMUNICATION DEVICE

FIELD

The present application relates to the technical field of data communication, and in particular to a data processing method and device for frame synchronization, and a communication system, a communication device, a communication apparatus and a storage medium.

BACKGROUND

In conventional communication systems, a sender may transmit predetermined synchronization word(s) to a receiver when transmitting data to the receiver, so that the receiver can obtain start information of a data frame in a received data stream based on the synchronization word, thereby the receiver can properly receive the data frame transmitted by the sender.

Therefore, a synchronization field of the data frame carrying the synchronization word is critical for the receiver, otherwise the start information of the data frame cannot be obtained and the data frame transmitted by the sender cannot be received properly. However, the synchronization field of the data frame does not contain any information, and an overly long synchronization field significantly affects the efficiency of data transmission, while an overly short synchronization field can be missed by the receiver under a harsh communication environment. Moreover, the receiver needs to store a specific synchronization word in advance and needs to compare the received data stream with the pre-stored synchronization word, respectively, before it can be determined as the synchronization field of the data frame.

SUMMARY

Based on this, it is provided a data processing method and device for frame synchronization, a communication system, a communication device, a communication apparatus and a storage medium to address the above technical problems, where the receiver can determine the start position of a data frame sent from a sender without using a synchronization word(s) in the communication system, and improving the efficiency of data transmission in the communication system.

A data processing method for frame synchronization includes: processing frame parameter information to generate a frame parameter field with a set pattern; packing the frame parameter field with payload data to obtain frame structure data; and sending the frame structure data, wherein the set pattern is used by a receiving end to position the frame parameter field in a received data stream, and subsequently to obtain the frame structure data from the data stream based on the frame parameter field.

In an implementation, the receiving end identifies the set pattern by performing an autocorrelation processing on the data stream and determines a sampled data fragment with the set pattern in the data stream as the frame parameter field to position the frame parameter field.

In an implementation, the data processing method for frame synchronization further includes: performing a redundancy processing on a frame parameter to generate the frame parameter information.

In an implementation, the length of the frame parameter is smaller than the length of the frame parameter information, and the length of the frame parameter information is smaller than the length of the frame parameter field.

In an implementation, the frame parameter represents related information of the payload data.

In an implementation, the sending the frame structure data includes: sending the frame structure data over a narrowband channel.

In an implementation, the processing frame parameter information includes: generating related frame parameter information corresponding to the frame parameter information based on the frame parameter information; and merging the frame parameter information with the related frame parameter information.

In an implementation, the generating related frame parameter information corresponding to the frame parameter information based on the frame parameter information includes: performing a time sequence inversion on data in the frame parameter information to generate the related frame parameter information.

In an implementation, the generating related frame parameter information corresponding to the frame parameter information based on the frame parameter information includes: performing an inversion operation on data in the frame parameter information, and performing a time sequence inversion on the data after inversion operation to generate the related frame parameter information.

In an implementation, the generating related frame parameter information corresponding to the frame parameter information based on the frame parameter information includes: performing an inversion operation on data in the frame parameter information to generate the related frame parameter information.

In an implementation, the generating related frame parameter information corresponding to the frame parameter information based on the frame parameter information includes: performing replication processing on data in the frame parameter information to generate the related frame parameter information.

In an implementation, the merging the frame parameter information with the related frame parameter information includes: the related frame parameter information is added to the rear or front of the frame parameter information, no symbol interval or symbols with fixed length are arranged between the related frame parameter information and the frame parameter information.

A data processing method for frame synchronization includes: obtaining a sampled data fragment from a received data stream; determining the sampled data fragment as a frame parameter field to position the frame parameter field when the sampled data fragment is detected with a set pattern, wherein the frame parameter field is generated by processing frame parameter information by a sending end and has the set pattern; obtaining frame structure data from the data stream based on the frame parameter field, wherein the frame structure data is obtained by the sending end by packing the frame parameter field with payload data.

In an implementation, the data processing method for frame synchronization further includes: obtaining a sampled data fragment time of the data stream, wherein the sampled data fragment time is determined based on a data length of the frame parameter field and a transmission rate of data; wherein the obtaining a sampled data fragment from a received data stream includes: obtaining the sampled data fragment from the received data stream based on the sampled data fragment time.

In an implementation, the data processing method for frame synchronization further includes: detecting whether the sampled data fragment has the set pattern by performing an autocorrelation processing; determining that the sampled data fragment has the set pattern when processing result of the autocorrelation processing conforms to a predetermined condition; wherein the frame parameter field is generated by merging the frame parameter information and related frame parameter information corresponding to the frame parameter information by the sending end.

In an implementation, the related frame parameter information is obtained by performing time sequence inversion on data in the frame parameter information.

In an implementation, the related frame parameter information is obtained by performing a time sequence inversion operation after performing an inversion operation on data in the frame parameter information.

In an implementation, the related frame parameter information is obtained by performing an inversion operation on data in the frame parameter information.

In an implementation, the related frame parameter information is obtained by performing replication processing on data in the frame parameter information.

In an implementation, after determining the sampled data fragment as a frame parameter field, the method further includes: obtaining the frame parameter information from the frame parameter field based on the set pattern; performing redundancy decoding on the frame parameter information to obtain frame parameter; determining related information of the payload data based on the frame parameter.

In an implementation, a data processing method for frame synchronization further includes: receiving the data stream over a narrowband channel.

A data processing device for frame synchronization includes: a processing module for processing frame parameter information to generate a frame parameter field with a set pattern; a packing module for packing the frame parameter field with payload data to obtain frame structure data; a sending module for sending the frame structure data, wherein the set pattern is used by a receiving end to position the frame parameter field in a received data stream, and subsequently to obtain the frame structure data from the data stream based on the frame parameter field.

A data processing device for frame synchronization includes: a sampled data fragment acquisition module for obtaining a sampled data fragment from a received data stream; a positioning module for determining the sampled data fragment as a frame parameter field to position the frame parameter field when the sampled data fragment is detected with a set pattern, wherein the frame parameter field is generated by processing frame parameter information by a sending end and has the set pattern; a frame structure data acquisition module for obtaining frame structure data from the data stream according to the frame parameter field, wherein the frame structure data is obtained by the sending end by packing the frame parameter field with payload data.

A communication system includes: a sending end and a receiving end; wherein the sending end is configured for processing frame parameter information to generate a frame parameter field with a set pattern; the sending end is further configured for packing the frame parameter field with payload data to obtain frame structure data; the sending end is further configured for sending the frame structure data to the receiving end; the receiving end is configured for obtaining a sampled data fragment from a received data stream; the receiving end is further configured for determining the sampled data fragment as the frame parameter field to position the frame parameter field when the sampled data fragment is detected with a set pattern; the receiving end is further configured for obtaining the frame structure data from the data stream based on the frame parameter field.

A communication device includes: a first processing module for processing frame parameter information, generating a first frame parameter field with a set pattern, packing the first frame parameter field with payload data to obtain first frame structure data, and sending the first frame structure data to a sending end; a second processing module for obtaining a sampled data fragment from received data stream, determining the sampled data fragment as a second frame parameter field when the sampled data fragment is detected with the set pattern to position the second frame parameter field, and obtaining second frame structure data from the data stream based on the second frame parameter field.

In an implementation, the communication device is an intercom device.

A communication apparatus includes a memory, a processor and computer readable instructions stored on the memory which when executed by the processor, instruct the communication apparatus to perform the steps of any of the above-mentioned methods.

A computer readable storage medium on which computer readable instructions is stored, when executed, the computer readable instructions instruct the processor to perform the steps of any of the above-mentioned methods.

The above-mentioned data processing method and device for frame synchronization, the communication system, the communication device, the communication apparatus and the storage medium processes frame parameter information, generates frame parameter field with a set pattern, packs the frame parameter field with payload data to obtain frame structure data, sends frame structure data, and the set patterns are for the receiving end to position the frame parameter field in the received data stream, and then obtains the frame structure data from the data stream based on the frame parameter field. Therefore, when the sending end sends data to the receiving end, it is not necessary to provide a synchronization field in the transmitted data frame, and the receiving end can position the frame parameter field in the data stream and further obtain the frame structure data in the data stream by providing the frame parameter field with a set pattern in the frame structure data, thus realizing data synchronization without synchronization word and improving the data transmission efficiency of the sending end.

The above-mentioned data processing method and device for frame synchronization, the communication system, the communication device, the communication apparatus and the storage medium obtains a sampled data fragment from the received data stream, determines the sampled data fragment as a frame parameter field when the sampled data fragment is detected with a set pattern, and the frame parameter field is generated by the sending end processing the frame parameter information and has a set pattern, obtains frame structure data from the data stream based on the frame parameter field, wherein the frame structure data is obtained by packing the frame parameter field with the payload data by the sending end. In the process of identifying the start position of the frame structure data sent from the sending end from the received data stream, since the set pattern carried by the sampled data fragment itself is detected instead of the consistency detection of the pattern sequence, there is no need to store a predetermined pattern sequence at the sending end and receiving end, and the identification is efficient, which significantly reduces the processing complexity and storage space.

BRIEF DESCRIPTION OF THE DRAWINGS

FIG. 2 is a schematic flow chart of a data processing method for frame synchronization according to an embodiment;

FIG. 3 is a schematic structural diagram of a frame structure of a frame structure data according to an embodiment;

FIG. 4 is a schematic structural diagram of a frame structure of a data frame according to an embodiment;

FIG. 8 is a schematic flow chart of a data processing method for frame synchronization according to another embodiment;

FIG. 10 is a schematic structural diagram of a frame structure of a frame structure data according to an embodiment;

DETAILED DESCRIPTION

To make the objectives, technical solutions and advantages of the present application clearer, the present application will be further described in detail below with reference to the accompanying drawings and embodiments. It should be understood that the specific embodiments described herein are merely intended to explain the present application and are not intended to limit the present application.

Figure 1:
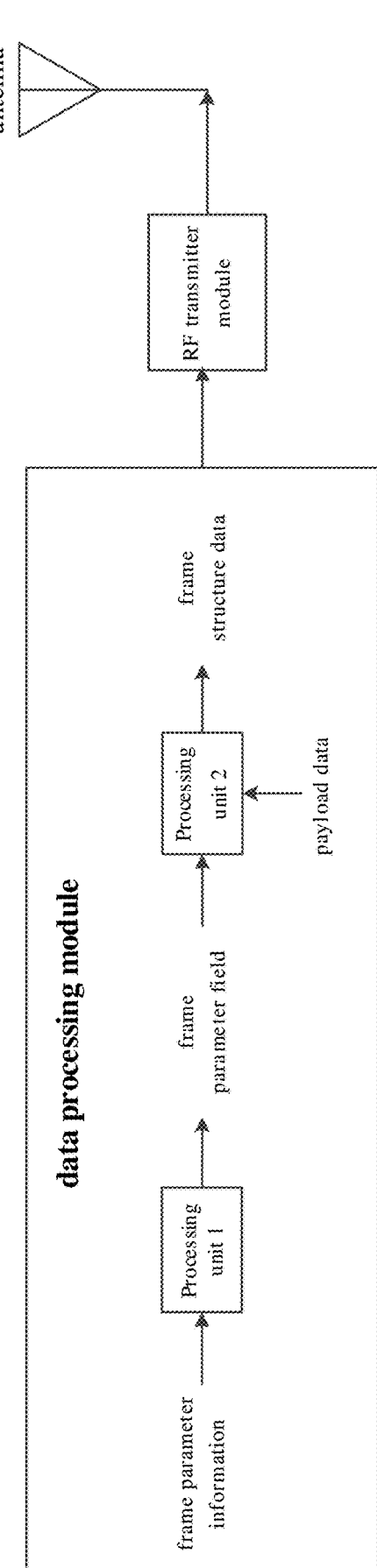
FIG. 1 is a diagram showing application environment for a data processing method for frame synchronization according to an embodiment.

The present application provides a data processing method for frame synchronization, which is applied to a device at the sending end as shown in FIG. 1. As shown in FIG. 1, the device at the sending end includes a data processing module, an RF transmitter module, and an antenna. The data processing module is configured to process frame parameters, generate frame parameter field with a set pattern, and pack the frame parameter field with payload data to obtain frame structure data. Specifically, the processing unit 1 in the data processing module is configured to process the frame parameter information to generate the frame parameter field with the set pattern. Further, the frame structure data is sent to the device at the receiving end via the RF transmitter module and the antenna. The device at the receiving end receives the carrier signal and positions the frame parameter field from the data stream of the carrier signal based on the set pattern, and then obtains the frame structure data from the data stream based on the frame parameter field. The device at the sending end may be a walkie-talkie.

The present application provides a data processing method for frame synchronization, which is applied to a device at the sending end as shown in FIG. 1. As shown in FIG. 2, a data processing method for frame synchronization includes the following steps:

S202, processing frame parameter information to generate a frame parameter field with a set pattern.

In this embodiment, the sending end obtains frame information to be sent, and the frame information includes frame parameter information and payload data. The frame parameter information contains information about the payload data, such as the type of the payload data and length information. The sending end processes the frame parameter information and generates a frame parameter field with a set pattern, and the frame parameter field contains the frame parameter information. It may be that the sending end processes the frame parameter information based on a predetermined specified pattern such that the resulting processed frame parameter field conforms to the set pattern. For example, the frame parameter information is information X, and the sending end processes the frame parameter information based on the specified pattern to obtain the frame parameter field as information XX, and the information XX conforms to the symmetric set pattern.

S204, packing the frame parameter field with payload data to obtain frame structure data.

In this embodiment, the sending end packs the frame parameter field with the payload data. It may be that the sending end generates the frame parameter field based on the frame parameter information, and then packs the frame parameter field with the payload data to obtain the frame structure data based on the frame structure shown in FIG. 3.

S206, sending the frame structure data, wherein the set pattern is used by a receiving end to position the frame parameter field in a received data stream, and subsequently to obtain the frame structure data from the data stream based on the frame parameter field.

In this embodiment, the sending end sends the frame structure data to the receiving end. The receiving end positions the frame parameter field from the received data stream based on the set pattern, and then obtains the frame structure data from the data stream based on the frame parameter field. Thus, the receiving end can position the frame parameter field from the data stream based on the set pattern of the frame parameter field, thus determine the start information of the frame structure data, realize frame synchronization of the frame structure data, and obtain the frame structure data from the data stream based on the frame parameter field to realize the extraction of the frame structure data.

Figure 5:
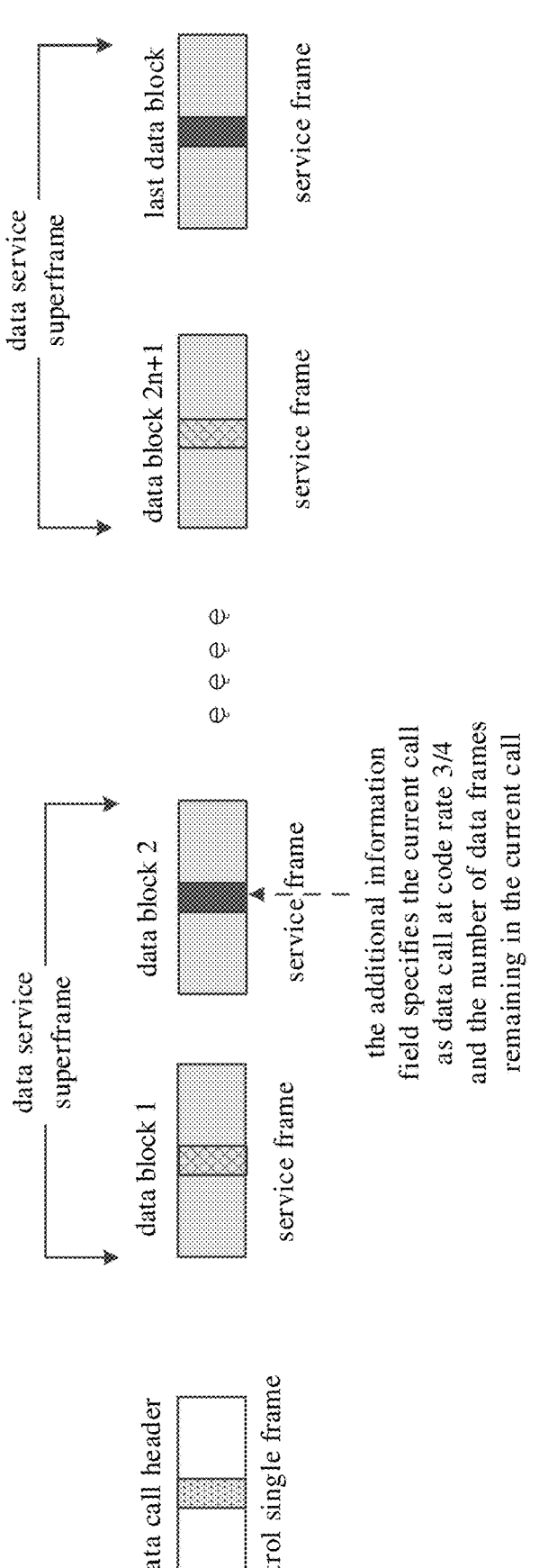
FIG. 5 is a schematic diagram of a data frame of a data service superframe according to an embodiment.
Figure 6:
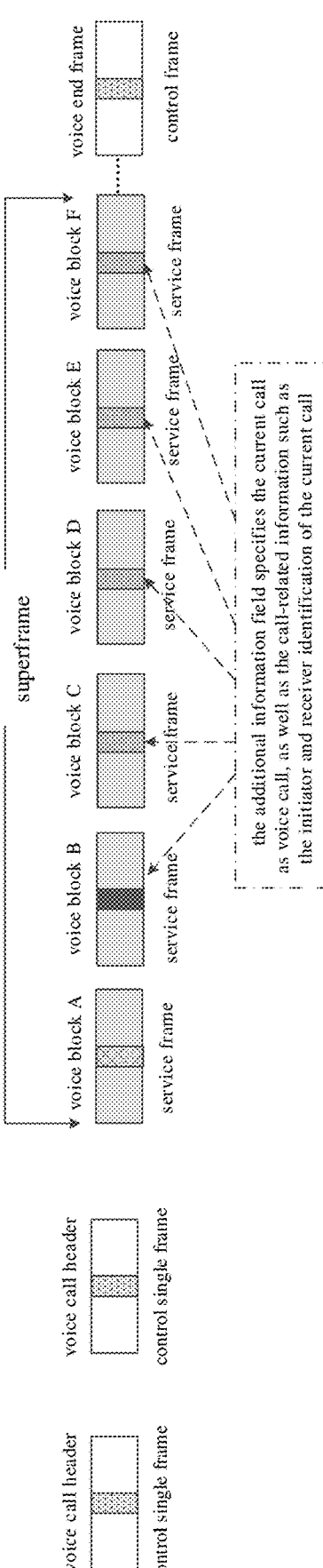
FIG. 6 is a schematic diagram of a data frame of a voice service superframe according to an embodiment.

Specifically, the sending end sends the frame structure data by means of data frames. The data frame may be any one of a short burst frame, a control single frame, and a service frame. In one possible implementation, the frame structure of the short burst frame is shown in FIG. 4(*a*), the frame structure of the control single frame is shown in FIG. 4(*b*), and the frame structure of the service frame is shown in FIG. 4(*c*). When the data frame is a short burst frame, the sending end sets the current frame as a short burst frame in the frame parameter information, and generates the frame parameter field with the set pattern from the frame parameter information, and then encapsulates the frame parameter field with payload data in the data frame shown in FIG. 4(a). When the data frame is a control single frame, the sending end sets the current frame as a control single frame in the frame parameter information, and generates the frame parameter field with the set pattern from the frame parameter information, and then encapsulates the frame parameter field with the payload data in the data frame shown in FIG. 4(b). When the data frame is a first service frame in a service superframe, the sending end sets the current frame as the service frame in the frame parameter information, and generates the frame parameter field with the set pattern from the frame parameter information, and then encapsulates the frame parameter field and the payload data in the data frame shown in FIG. 4(b). When the data frame is a non-first frame in a service superframe, the sending end encapsulates the additional information field and the payload data in the data frame as shown in FIG. 4(c). Here, the additional information field can carry current service-related information, such as whether it is a voice or data call, the initiator and receiver identification of the call, or system-related information such as the color code. The additional information field does not have the set pattern of the frame parameter field. Service superframe includes data service superframe and voice service superframe. A data call typically consists of a control single frame and a data service superframe, as shown in FIG. 5, where the call starts with a control single frame in the data call header, followed by multiple data service superframes, each of which contains multiple service frames. The frame parameter field in the middle of the first service frame specifies that the current frame is the first frame of a data service superframe, the additional information field in the middle of each subsequent frame can specify the current call as data call at code rate 3/4 and the number of data frames remaining in the current call. A voice call typically consists of a control single frame and a voice service superframe, as shown in FIG. 6, where the call typically begins with a control single frame in the voice call header, followed by multiple voice service superframes, which contain multiple service frames, with the frame parameter field in the middle of the first service frame specifying the current frame as the first frame of a voice service superframe, and the additional information field in the middle of each subsequent service frame specifying the current call as voice call, as well as the call-related information such as the initiator and receiver identification of the current call. When the receiving end receives the data stream from the sending end, it positions the frame parameter field from the data stream through the set pattern to position the start position of the frame structure data, and then realize the frame synchronization of the frame structure data.

In the data processing method for frame synchronization according to the present embodiment, compared with the conventional processing method for achieving frame synchronization using synchronization word, in which the conventional processing method for achieving frame synchronization of data frames using synchronization word requires providing synchronization word in the data frames at the sending end, and the length of the provided synchronization word needs to reach a certain length to achieve anti-interference. Therefore, an overly long synchronization word will lead to inefficient data transmission at the sending end. The receiving end needs to generate the synchronization word in the data frame locally when realizing the frame synchronization of the data frame, and may need to generate different synchronization words for different service types, such as a synchronization word for voice service and a synchronization word for data service. When the receiving end performs synchronization word recognition on the received data stream, a total number of N synchronization words need to perform N matching recognition operations, N being a positive integer. Therefore, the way of achieving frame synchronization of data frames through synchronization words at the receiving end will result in inefficient recognition of the start information of data frames.

In the data processing method for frame synchronization according to the present embodiment, the sending end generates frame parameter field with a set pattern by processing frame parameter information, and packs the frame parameter field with the set pattern with payload data to obtain frame structure data, and sends the frame structure data to the receiving end. Therefore, the sending end does not need to add a synchronization word when sending frame structure data, and the frame parameter information is processed to generate the frame parameter field with the set pattern, so that the receiving end can position the start information of the data frame of the frame structure data assisted by the frame parameter field with the set pattern, and realize the frame synchronization of the data frame of the frame structure data. The sending end does not need to use synchronization word in the data frame when sending the data frame of the frame structure data, which improves the data transmission efficiency at the sending end. In the process of identifying the start position of the frame structure data sent from the sending end from the received data stream, since the set pattern carried by the sampled data fragment itself is detected instead of the consistency detection of the pattern sequence, there is no need to store a predetermined pattern sequence at the sending end and receiving end, and the identification is efficient, which significantly reduces the processing complexity and storage space.

In one embodiment, the receiving end identifies the set pattern by performing an autocorrelation processing on the data stream and determines a sampled data fragment with the set pattern in the data stream as the frame parameter field to position the frame parameter field.

In this embodiment, the receiving end detects whether the data fragment of the received data stream conforms to the set pattern by performing an autocorrelation processing, and if so, determines the data fragment as the frame parameter field. The receiving end identifying the set pattern by performing the autocorrelation processing of the data stream may comprise: the receiving end collects data fragments in the data stream, performs specified processing on the data fragments, performs correlation detection of the unprocessed data fragments and the processed data fragments, and determines whether the data fragments conform to the set pattern based on the detection results. When the data fragment conforms to the set pattern, the data fragment is determined as a frame parameter field. Therefore, the receiving end can position the frame parameter field from the data stream by performing the autocorrelation processing. The receiving end only needs to perform the autocorrelation processing once to position the frame parameter field of the frame structure data regardless of how many types of frame parameter field there are, which improves the efficiency of identifying the frame synchronization of the data frame of the frame structure data. For the receiving end, identifying the start position of the frame structure data sent from the sending end in the received data stream can be performed on the data fragment only, i.e., in the way of autocorrelation processing. Therefore, there is no need to store predetermined pattern sequences at the sending and receiving ends, and the identification efficiency is high, significantly reducing processing complexity and storage space.

In an embodiment, prior to the step of processing the frame parameter information, the method described above further includes the step of: performing redundancy processing on the frame parameter to generate the frame parameter information.

In this embodiment, the frame parameter represents related information of the payload data. For example, the related information includes length information and type information of the payload data, etc. The redundancy processing may includes expanding the frame parameter using Hamming code to obtain the frame parameter information. By way of example, the frame parameter is 0110, a simple Hamming code is used to extend the frame parameter to obtain the frame parameter information as 0110001. The redundancy processing on the frame parameter results in the frame parameter information containing a large amount of redundant information, thus achieving strong protection of the frame parameter. In addition, the redundant information is also beneficial for the receiving end to recover the frame parameters of the code element positioning and data frame even in the case of high bit error rate (BER). The frame parameter information obtained after redundancy processing mainly contains related information of TDMA (Time division multiple access) bursts of frame structure data. By way of example, the related information indicates that the TDMA burst of the frame structure data is a short burst with a length of 10 ms, a standard burst with a length of 27.5 ms, or a long burst with an extended length of 30 ms. And/or, the related information contains the forward error correction code used for the payload data in the TDMA burst of the frame structure data. And/or, the related information contains the type of service carried by the TDMA burst of the frame structure data, such as the type of voice service or the type of data service. Thus, the redundancy processing on frame parameters to obtain frame parameter information enables different types of services to be provided for data transmission in the communication system.

In one implementation of this embodiment, the length of the frame parameter is smaller than the length of the frame parameter information, and the length of the frame parameter information is smaller than the length of the frame parameter field.

Since the frame parameter information is generated after redundancy processing on the frame parameter, the length of the frame parameter information is greater than the length of the frame parameter at this point. In addition, the processing on the frame parameter information generates a frame parameter field, the length of which is greater than the length of the frame parameter information. For example, the frame parameter is 3 bits, the frame parameter information is 24 bits, and the frame parameter field is 48 bits. In the data frame transmission process of frame structure data, the amount of bits occupied by frame parameters is small, and the frame parameter information is obtained by redundancy processing on frame parameters, and then the frame parameter information is processed to obtain a frame parameter field with a set pattern. In this way, the expansion of frame parameters is achieved, and the expanded frame parameter field has a larger amount of bits, thus improving the anti-interference capability of the frame parameter field during the data frame transmission of the frame structure data.

It should be noted that the lengths of the frame parameter, frame parameter information and frame parameter field can all be adjusted according to actual needs, and the length of the frame parameter field may also be longer or shorter than twice the length of the frame parameter information. Also, although the frame parameter field obtained by processing the frame parameter information according to the present application is longer than that of the frame parameter information, the length of the frame parameter field obtained according to the present application is shorter than the total length of the frame parameter information and the synchronization header in the conventional solution.

In an embodiment, the step of sending frame structure data in any one of the above embodiments includes: sending frame structure data over a narrowband channel.

In this embodiment, the sending end sends the frame structure data to the receiving end over the narrowband channel. That is, the data processing method for frame synchronization of this embodiment is applied to a narrowband communication system in which the sending end and the receiving end in the narrowband communication system communicate via the narrowband channel. In the narrowband communication system, the data transmission rate of the narrowband channel is low, and the amount of data transmitted per unit time is small. In this embodiment, the sending end does not need to provide the synchronization word in the data frame of the frame structure data, but only needs to provide the frame parameter field with a set pattern using the frame parameter of the data frame. The receiving end can use the set pattern to position the frame parameter field in the received data stream to determine the start position of the frame structure data, so as to realize the frame synchronization of the frame structure data, avoid using the synchronization word during the data transmission, and improve the efficiency of the data transmission at the sending end.

In an embodiment, the above step of processing frame parameter information includes: generating related frame parameter information corresponding to the frame parameter information based on the frame parameter information; and merging the frame parameter information with the related frame parameter information.

In this embodiment, the related frame parameter information is associated with the frame parameter information, and the frame parameter field obtained after merging the frame parameter information with the related frame parameter information has a set pattern. In one implementation, the related frame parameter information is obtained by performing data deformation on the frame parameter information. That is to say, the related frame parameter information is correlated with the frame parameter information. Specifically, the related frame parameter information can be generated by performing data deformation on the frame parameter information according to specified rules. Further, the frame parameter information is merged with the related frame parameter information to obtain the frame parameter field. Since the related frame parameter information is correlated with the frame parameter information, the resulting frame parameter field conforms to the set pattern, and the frame parameter field in the frame structure data can be positioned based on the set pattern.

In one embodiment, the above generating related frame parameter information corresponding to the frame parameter information based on the frame parameter information includes: performing a time sequence inversion on data in the frame parameter information to generate the related frame parameter information.

In this embodiment, the sending end performs a time sequence inversion on the data in the frame parameter information to obtain the related frame parameter information, and then merges the frame parameter information with the related frame parameter information to obtain a frame parameter field conforming to the set pattern. For example, by adding the related frame parameter information to the rear of the frame parameter information, the resulting frame parameter field conforms to the pattern of even symmetry structure. For example, if the frame parameter information is 01100101 and the related frame parameter information is 10100110 after time sequence inversion, the frame parameter field is 0110010110100110 after merging the two, which shows that the frame parameter field conforms to the pattern of even symmetry structure. Therefore, the frame parameter field is constructed to conform to the set pattern, and the receiving end can position the frame parameter field from the data stream through the set pattern, thus realizing the positioning of the start information of the frame structure data.

In other implementations of this embodiment, it is also possible to add the related frame parameter information to the front of the frame parameter information, or to add the related frame parameter information to other locations of the frame parameter information. As long as the related frame parameter information is added to the frame parameter information, and the resulting frame parameter field conforms to the set pattern.

In one embodiment, the above generating related frame parameter information corresponding to the frame parameter information based on the frame parameter information includes: performing an inversion operation on data in the frame parameter information, and performing a time sequence inversion on the data after inversion operation to generate the related frame parameter information.

In this embodiment, the sending end performs an inversion operation on the data in the frame parameter information, and performs a time sequence inversion on the data after inversion operation to obtain the related frame parameter information, and then merges the frame parameter information with the related frame parameter information, and the resulting frame parameter field conforming to the set pattern. For example, by adding the related frame parameter information to the rear of the frame parameter information, the resulting frame parameter field conforms to the pattern of odd symmetry structure. By way of example, the frame parameter information is 01100101, the frame parameter information is 10011010 after inversion operation, and the related frame parameter information is 01011001 after the time sequence inversion, and the frame parameter field is 0110010101011001 after merging the two, which shows that the frame parameter field conforms to the pattern of odd symmetry structure. Therefore, the frame parameter field is constructed to conform to the set pattern, and the receiving end can position the frame parameter field from the data stream through the set pattern, thus realizing the positioning of the start information of the frame structure data.

In other implementations of this embodiment, it is also possible to add the related frame parameter information to the front of the frame parameter information, or to add the related frame parameter information to other locations of the frame parameter information. As long as the related frame parameter information is added to the frame parameter information, and the resulting frame parameter field conforms to the set pattern.

In one embodiment, the above generating related frame parameter information corresponding to the frame parameter information based on the frame parameter information includes: performing an inversion operation on data in the frame parameter information to generate the related frame parameter information.

In this embodiment, the sending end performs an inversion operation on the data in the frame parameter information to obtain the related frame parameter information, and then merges the frame parameter information with the related frame parameter information to obtain a frame parameter field conforming to the set pattern. For example, after adding the related frame parameter information to the rear of the frame parameter information, the resulting frame parameter field conforms to the set pattern. By way of example, the frame parameter information is 01100101 and the data is 10011010 after the inversion operation, the frame parameter field is 0110010110011010 after merging the two, which shows that the frame parameter field conforms to the set pattern, i.e., the first half of the information is the inverse of the second half. Therefore, the frame parameter field is constructed to conform to the set pattern, and the receiving end can position the frame parameter field from the data stream through the set pattern, thus realizing the positioning of the start information of the frame structure data.

In other implementations of this embodiment, it is also possible to add the related frame parameter information to the front of the frame parameter information, or to add the related frame parameter information to other locations of the frame parameter information. As long as the related frame parameter information is added to the frame parameter information, and the resulting frame parameter field conforms to the set pattern.

In one embodiment, the above generating related frame parameter information corresponding to the frame parameter information based on the frame parameter information includes: performing a replication processing on data in the frame parameter information to generate the related frame parameter information.

In this embodiment, the sending end performs a replication processing on the data in the frame parameter information to obtain the related frame parameter information, and then merges the frame parameter information with the related frame parameter information to obtain a frame parameter field conforming to the set pattern. For example, by adding the related frame parameter information to the rear of the frame parameter information, the resulting frame parameter field conforms to the pattern of consisting of multiple identical data fragments. By way of example, the frame parameter information is 01100101 and the data is 01100101 after replication processing, the frame parameter field is 0110010101100101 after merging the two, which shows that the frame parameter field consists of two identical data fragments. Therefore, the frame parameter field is constructed to conform to the set pattern, and the receiving end can position the frame parameter field from the data stream through the set pattern, thus realizing the positioning of the start information of the frame structure data.

In other implementations of this embodiment, it is also possible to add the related frame parameter information to the front of the frame parameter information, or to add the related frame parameter information to other locations of the frame parameter information. As long as the related frame parameter information is added to the frame parameter information, and the resulting frame parameter field conforms to the set pattern.

It should be noted that in other embodiments, the related frame parameter information is obtained in a manner not limited to the four manners described above, but may also be preset information set in advance in the device at the sending end according to actual requirements. As long as the preset information is added to the frame parameter information, and the resulting frame parameter field conforms to the set pattern.

In one embodiment, the merging the frame parameter information with the related frame parameter information in the above embodiment includes: the related frame parameter information is added to the rear or front of the frame parameter information, no symbol interval or symbols with fixed length are arranged between the related frame parameter information and the frame parameter information.

In this embodiment, the related frame parameter information is added to the front or rear of the frame parameter information to merge the frame parameter information with the related frame parameter information. There is no symbol interval between the related frame parameter information and the frame parameter information. Alternatively, symbols with fixed length are arranged between the related frame parameter information and the frame parameter information. Thus, the resulting frame parameter field after the merging process conforms to the set pattern.

The data processing method for frame synchronization described in each of the above embodiments is applied to the sending end of data frame transmission in a communication system. The sending end achieves frame synchronization of frame structure data by providing the frame parameter field with a set pattern, avoiding the use of synchronization word in the frame structure data and improving the data transmission efficiency at the sending end.

Figure 7:
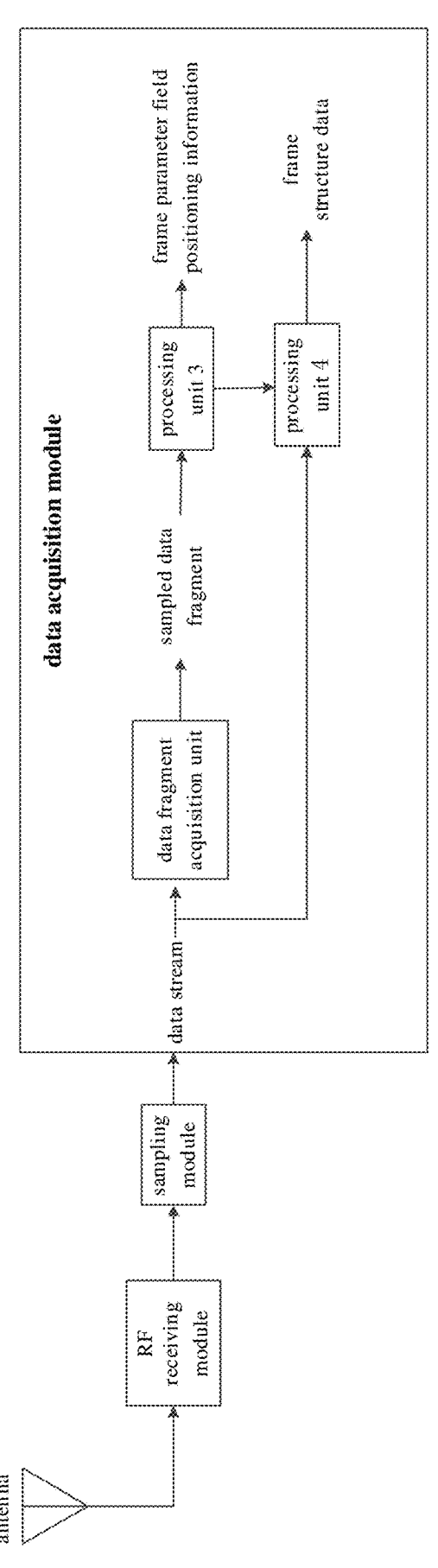
FIG. 7 is a diagram showing application environment for a data processing method for frame synchronization according to another embodiment.

The present application further provides a data processing method for frame synchronization, which is applied to a device at the receiving end as shown in FIG. 7. As shown in FIG. 7, the device at the receiving end includes a data acquisition module, a sampling module, an RF receiving module, and an antenna. The data acquisition module is used to implement the data processing method for frame synchronization of the present application. Specifically, the device at the receiving end receives radio signals through the antenna, and the RF receiving module sends the radio signals to the sampling module, which performs signal sampling and then obtains the data stream. The data fragment acquisition unit in the data acquisition module samples the received data stream, obtains the sampled data fragment, and outputs the sampled data fragment to the processing unit 3. The processing unit 3 detects the sampled data fragment, and when the sampled data fragment is detected with a set pattern, determines the sampled data fragment as a frame parameter field to position the frame parameter field, and outputs the frame parameter field positioning information to the processing unit 4. The processing unit 4 obtains the frame structure data from the received data stream based on the frame parameter field positioning information. The frame structure data is obtained by packing the frame parameter field with the payload data at the sending end. Thus, positioning of the start information of the frame structure data is realized and the frame structure data is obtained from the received data stream.

The present application further provides a data processing method for frame synchronization, which is applied to a device at the receiving end as shown in FIG. 7. As shown in FIG. 8, a data processing method for frame synchronization includes the following steps:

S802, obtaining a sampled data fragment from the received data stream.

Figure 9:
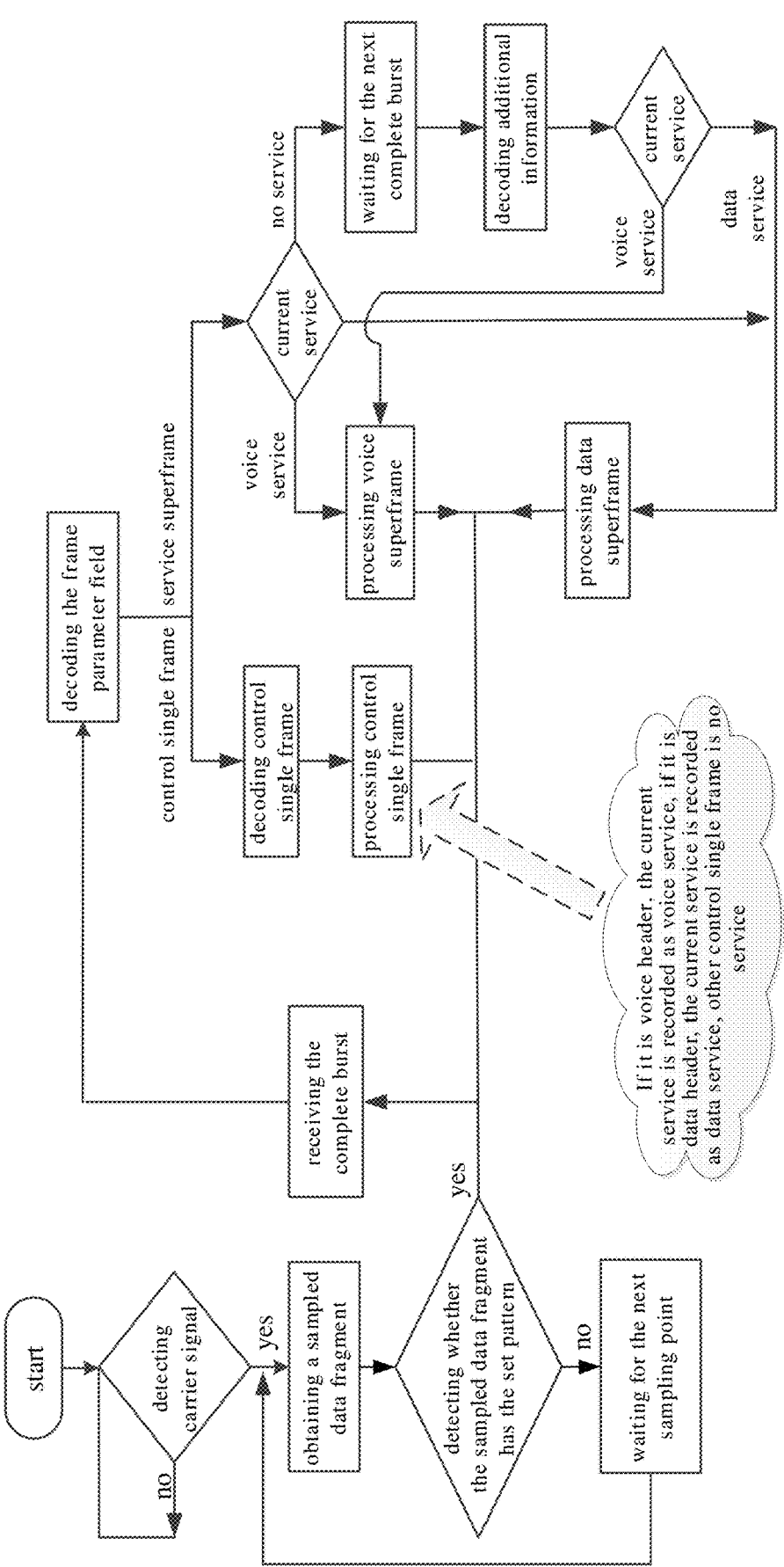
FIG. 9 is a flow chart of the processing of a received data stream by a device at the receiving end according to an embodiment.

In this embodiment, the receiving end receives the data stream sent by the sending end and samples the data stream to obtain the sampled data fragment. Specifically, as shown in FIG. 9, when a carrier signal is detected at the receiving end, the data stream is sampled. It may be that the data stream is sampled at the specified sampling frequency to obtain the sampled data. The multiple sampled data are merged to obtain the sampled data fragment.

S804, the sampled data fragment is determined as a frame parameter field to position the frame parameter field when the sampled data fragment is detected with a set pattern, wherein the frame parameter field is generated by processing frame parameter information by a sending end and has the set pattern.

In this embodiment, the data frame sent by the sending end has a frame parameter field with a set pattern. As shown in FIG. 9, the receiving end detects the sampled data fragment, and when the sampled data fragment is detected to have a set pattern, the sampled data fragment is determined as the frame parameter field. For example, when the set pattern of the frame parameter field is expressed in the data structure of the frame parameter field, the receiving end detects the data structure of the sampled data fragment and determine the sampled data fragment as the frame parameter field when the data structure of the sampled data fragment is detected conforming to the set pattern. For example, if the set pattern of the frame parameter field exhibits that the frame parameter field conforms to the odd symmetry structure, the receiving end determines the sampled data fragment as the frame parameter field when detecting that the sampled data fragment conforms to the odd symmetry structure. —If the set pattern of the frame parameter field exhibits that the frame parameter field conforms to the even symmetry structure, the receiving end determines the sampled data fragment as the frame parameter field when detecting that the sampled data fragment conforms to the even symmetry structure.

When the receiving end determines the sampled data fragment as the frame parameter field, the frame parameter field of the frame structure data can be positioned from the data stream, and the start position of the data frame of the frame structure data can be determined to achieve frame synchronization of the frame structure data.

S806, the frame structure data is obtained from the data stream according to the frame parameter field, wherein the frame structure data is obtained by the sending end by packing the frame parameter field with payload data.

In this embodiment, the frame parameter field contains frame parameter information, so that the receiving end can obtain frame structure data from the data stream based on the frame parameter field. For example, if the frame parameter information contains information about TDMA bursts of the frame structure data, the TDMA bursts of the frame structure data can be identified from the data stream by the frame parameter information, and then the frame structure data can be determined. Specifically, the receiving end obtains the frame structure data from the data stream based on the positioning information in the frame parameter field. Since the start position of the frame structure data can be identified through the positioning information of the frame parameter field, the receiving end can determine the start position of the frame structure data from the data stream based on positioning information of the frame parameter field, and then obtain the frame structure data from the data stream.

As shown in FIG. 9, after detecting the frame parameter field, the receiving end receives the complete burst, decodes the frame parameter field to obtain the frame parameter of the frame structure data, and identifies the data frame type of the current burst based on the frame parameter, such as control single frame or service superframe. The data processing method as shown in FIG. 9 is used for different data frame types to obtain the frame structure data.

In the data processing method for frame synchronization according to the present embodiment, compared with the conventional processing method for achieving frame synchronization using synchronization word, in which the conventional processing method for achieving frame synchronization using synchronization word, the sending end needs to provide synchronization word in the data frame, and the receiving end needs to locally generate the synchronization word of the data frame sent by the sending end when achieving frame synchronization of the data frame, and different synchronization words need to be generated for data frames of different service types, such as a synchronization word for voice service, and a synchronization word for data service. In the frame synchronization of data frames, the receiving end performs synchronization word recognition on the received data stream, a total number of N synchronization words need to perform N matching recognition operations, N being a positive integer. Therefore, the way of achieving synchronization recognition of data frames by synchronization word at the receiving end will result in inefficient recognition of the start information of data frames.

In the data processing method for frame synchronization in this embodiment, when the receiving end realizes frame synchronization of frame structure data, there is no need to store a predetermined pattern sequence, and the frame parameter field of the frame structure data can be positioned in the received data stream only based on the set pattern, which realizes the frame synchronization of frame structure data without synchronization words, without multiple frame parameter field identification operations, which improves the frame synchronization efficiency of frame structure data and significantly reduces processing complexity and storage space.

In one embodiment, before the above step of obtaining a sampled data fragment from the received data stream, the method further includes: obtaining a sampled data fragment time of the data stream, wherein the sampled data fragment time is determined according to a data length of the frame parameter field and a transmission rate of data. The above step of obtaining a sampled data fragment from a received data stream includes: obtaining the sampled data fragment from the received data stream based on the sampled data fragment time.

Figure 10:
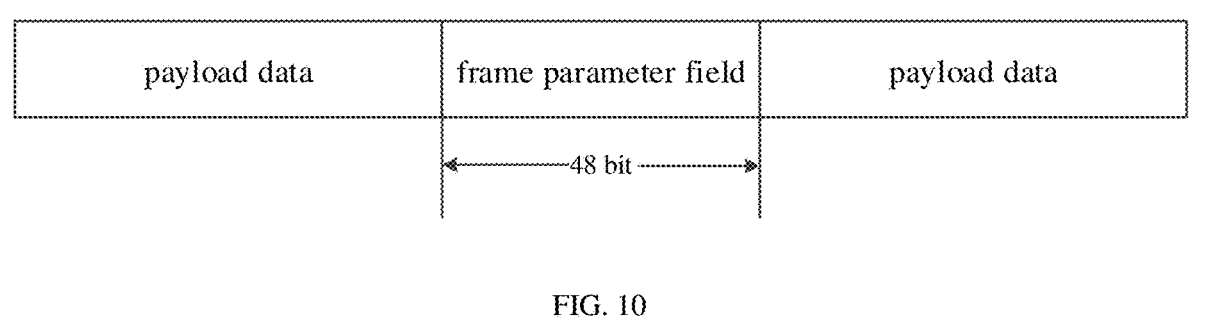

In this embodiment, the receiving end determines the sampled data fragment time based on the data length of the frame parameter field and the transmission rate of the data, and obtains the sampled data fragment from the data stream based on the sampled data fragment time. For example, as shown in FIG. 10, the data length of the frame parameter field in the frame structure data is 48 bits. The sending end and the receiving end transmit the data frame over a narrowband channel with a data transmission rate of 9.6 kbit/s. The sampled data fragment time determined based on the data length of the frame parameter field and the data transmission rate is 5 ms. When the carrier signal is detected at the receiving end, the sampled data fragment of 5 ms is obtained from the data stream of the baseband signal.

In an implementation, the obtaining a sampled data fragment from the received data stream based on the sampled data fragment time includes: obtaining a sampling frequency of the data stream, sampling the data stream based on the sampling frequency, obtaining a plurality of sampled data, determining a sampled quantity of the data stream based on the sampling frequency and the sampled data fragment time, obtaining a sampled data of the sampled quantity from the plurality of sampled data, merging the sampled data of the sampled quantity to obtain the sampled data fragment.

For example, 9.6 kbit/s is the transmission rate of data frames of the communication system, i.e., 9.6 k bits are transmitted per second over the wireless channel. When the communication system uses 4FSK modulation, each symbol carries 2 bits, so the symbol rate is 4.8 k symbols per second. According to Nyquist's law, the sampling frequency needs to be at least twice the symbol rate to recover the original symbols, so the sampling frequency is at least 9.6 kHz. But in fact, the sampling frequency can be up to 24 kHz or 48 kHz. For a sampling frequency of 24 kHz, the sampled quantity for a 5 ms sampled data fragment is 120, and the 120 sampled data are merged to obtain the 5 ms sampled data fragment.

The higher the sampling frequency used, the smaller the deviation between the center point of the positioned symbols and the actual center point, the more accurate the symbols recovered after sampling, and the lower the BER. Thus, the accuracy of the positioning of the frame parameter field can be improved by adjusting the sampling frequency of the data stream at the receiving end.

In an embodiment, before the above step of determining the sampled data fragment as a frame parameter field when the sampled data fragment is detected with a set pattern, the method further includes: detecting whether the sampled data fragment has the set pattern by performing an autocorrelation processing; determining that the sampled data fragment has the set pattern when processing result of the autocorrelation processing conforms to a predetermined condition; wherein the frame parameter field is generated by merging the frame parameter information and related frame parameter information corresponding to the frame parameter information by the sending end.

In this embodiment, since the frame parameter information in the frame parameter field corresponds to the related frame parameter information, the receiving end can determine whether the sampled data fragment is a frame parameter field by performing an autocorrelation processing on the sampled data fragment. If the sampled data fragment is a frame parameter field, by performing an autocorrelation processing on the sampled data fragment, it can identify whether the sampled data fragment has a set pattern or not. By way of example, suppose the frame parameter information is information A, the related frame parameter information is information B, and the frame parameter field is information AB after merging the two. The autocorrelation processing is: comparing the sampled data fragment after inversion with the sampled data fragment before inversion, and determining whether the sampled data fragment conforms to the set pattern based on the comparison result. In this case, the receiving end obtains information BA after inverting information AB, and compares information AB with information BA. Since information A and information B are correlated, the correlation between information A and information B can be used to detect whether information AB conforms to the set pattern.

The predetermined condition is related to the set pattern of the frame parameter field, and the predetermined condition is determined according to the set pattern. For example, if the set pattern is a pattern of the even symmetry structure of the frame parameter field, the result obtained after performing autocorrelation processing on the frame parameter field conforms to a particular condition, and the particular condition is provided as the predetermined condition at this time. When the receiving end detects whether the sampled data fragment is a frame parameter field, it performs auto-correlation processing on the sampled data fragment, and when the result of the autocorrelation processing conforms to the predetermined condition, it can be recognized that the sampled data fragment conforms to the pattern of even symmetry structure. Therefore, when the receiving end positions and identifies the frame parameter field, there is no need to locally generate a pattern sequence such as a synchronization word or to perform a synchronization word matching operation, and the frame parameter field in the data stream can be positioned only by performing an autocorre-lation processing, which improves the recognition efficiency of the frame parameter field.

In one embodiment, the related frame parameter infor-mation is obtained by performing time sequence inversion on data in the frame parameter information.

In this embodiment, the related frame parameter infor-mation is obtained by performing time sequence inversion on the frame parameter information, and the set pattern is the pattern of even symmetry structure, and the autocorrelation processing is the correlation operation between the related data fragment after the time sequence inversion of the sampled data fragment and the sampled data fragment, and the predetermined condition is that the result value of the correlation operation meets the range of predetermined values. By way of example, the frame parameter information is 01100101, and the related frame parameter information obtained by time sequence inversion on the data of the frame parameter information is 10100110, the frame parameter field is 0110010110100110 after merging the two. The frame parameter field has the pattern of even symmetry structure.

The autocorrelation processing performed on the sampled data fragments by the receiving end includes: assuming that the length of the frame parameter field is 5 ms, and the 5 ms signal received at the receiving end are a(1), a(2), . . . , a(n), and the related data fragment obtained by the time sequence inversion are b(1)=a(n), b(2)=a(n−1), . . . , b(n)=a(1). Where, a(1), a(2), . . . , a(n) respectively denote the sampled data within the 5 ms signal, and b(1), b(2), . . . , b(n) respectively denote the individual data in the related data fragment. The correlation operation performed by the receiving end is: s=a(1)*b(1)+a(2)*b(2)+ . . . +a(n)*b(n). Where, s denotes the result value of the correlation operation. When s is greater than a positive threshold value, then the sampled data fragment is determined as a frame information field and bit synchronization and frame synchronization information is restored. The threshold value and the range of predetermined values are determined as follows:

If the symbol count of 0 and the symbol count of 1 in the frame parameter information are each half, then ideally the signal energy value of the frame parameter field is a constant value, independent of the frame parameter information car-ried. At this point, the energy value e of a frame parameter field can be obtained in advance. e=a(1)*a(1)+a(2)*a(2)+ . . . +a(n)*a(n), and then the energy value e is multiplied by 0.5 as the threshold value for judgment, and then a range of predetermined values is set according to the threshold value. When s is a value within the range of predetermined values, it can be determined that the sampled data fragment conforms to the pattern of even symmetry structure, and then the sampled data fragment is identified as a frame parameter field. Of course, it is also possible to calculate in real time the energy value of the received 5 ms signal and then multiply it by 0.5 as the threshold value for determination. The 0.5 value here is an empirical value that can be adjusted according to the requirements of the actual application scenario.

In one embodiment, the related frame parameter infor-mation is obtained by performing a time sequence inversion operation after performing an inversion operation on data in the frame parameter information.

In this embodiment, the related frame parameter infor-mation is obtained by performing time sequence inversion and inversion operation on the frame parameter information, and the set pattern is the pattern of odd symmetry structure, and the autocorrelation processing is to perform time sequence inversion on the sampled data fragment, and then perform correlation operation on the related data fragment with the sampled data fragment, with the predetermined condition that the result value of the correlation operation meets the range of predetermined values. By way of example, the frame parameter information is 01100101, the related frame parameter information obtained by performing an inversion operation and then a time sequence inversion operation on data in the frame parameter information is 01011001, and the frame parameter field is 0110010101011001 after merging the two. The frame parameter field has the pattern of odd symmetry structure.

The autocorrelation processing performed on the sampled data fragments by the receiving end includes: assuming that the length of the frame parameter field is 5 ms, and the 5 ms signal received at the receiving end are a(1), a(2), . . . , a(n), and the related data fragment obtained by the time sequence inversion are b(1)=a(n), b(2)=a(n−1), . . . , b(n)=a(1). Where, a(1), a(2), . . . , a(n) respectively denote the sampled data within the 5 ms signal, and b(1), b(2), . . . , b(n) respectively denote the individual data in the related data fragment. The correlation operation performed by the receiving end is: s=a(1)*b(1)+a(2)*b(2)+ . . . +a(n)*b(n). Where, s denotes the result value of the correlation operation. When s is less than a positive threshold value, then the sampled data fragment is determined as a frame information field and bit synchronization and frame synchronization information is restored. The threshold value and the range of predetermined values are determined as follows:

If the symbol count of 0 and the symbol count of 1 in the frame parameter information are each half, then ideally the signal energy value of the frame parameter field is a constant value, independent of the frame parameter information car-ried. At this point, the energy value e of a frame parameter field can be obtained in advance. e=a(1)*a(1)+a(2)* a(2)+ . . . +a(n)*a(n), and then the energy value e is multiplied by −0.5 as the threshold value for judgment, and then a range of predetermined values is set according to the threshold value. When s is a value within the range of predetermined values, it can be determined that the sampled data fragment conforms to the pattern of even symmetry structure, and then the sampled data fragment is identified as a frame parameter field. Of course, it is also possible to calculate in real time the energy value of the received 5 ms signal and then multiply it by −0.5 as the threshold value for determination. The −0.5 value here is an empirical value that can be adjusted according to the requirements of the actual application scenario.

In one embodiment, the related frame parameter infor-mation is obtained by performing an inversion operation on data in the frame parameter information.

In this embodiment, the related frame parameter infor-mation is obtained by performing an inversion operation on data in the frame parameter information. The autocorrelation processing is a correlation operation between the second half of the data and the first half of the data of the sampled data fragment, with a predetermined condition that the result value of the correlation operation conforms to a range of predetermined values. For example, the frame parameter information is 01100101, and the related frame parameter information is 10011010 after performing an inversion operation on the data in the frame parameter information, and the frame parameter field is 0110010110011010 after merging the two. The autocorrelation processing performed on the sampled data fragments by the receiving end includes: assuming that the length of the frame parameter field is 5 ms, and the 5 ms signal received at the receiving end are $a(1)$, $a(2)$, . . . , $a(n)$ . . . $a(n+n)$. The correlation operation between the second half of the data and the first half of the data of the sampled data fragment is: $s=a(1)*a(n+1)+a(2)*a(n+2)+$ . . . $+a(n)*a(n+n)$. Where $a(1)$, $a(2)$, . . . , $a(n)$ . . . $a(n+n)$ respectively denote the sampled data within the 5 ms signal, and s denotes the result value of the correlation operation. When s is less than a positive threshold value, then the sampled data fragment is determined as a frame information field and bit synchronization and frame synchronization information is restored. The threshold value and the range of predetermined values are determined as follows:

If the symbol count of 0 and the symbol count of 1 in the frame parameter information are each half, then ideally the signal energy value of the frame parameter field is a constant value, independent of the frame parameter information carried. At this point, the energy value e of a frame parameter field can be obtained in advance. $e=a(1)*a(1)+a(2)*a(2)+$ . . . $+a(n)*a(n)$, and then the energy value e is multiplied by −0.5 as the threshold value for judgment, and then a range of predetermined values is set according to the threshold value. When s is a value within the range of predetermined values, it can be determined that the sampled data fragment conforms to the pattern of even symmetry structure, and then the sampled data fragment is identified as a frame parameter field. Of course, the average value of the first and second half of energy values of the received 5 ms signal can also be calculated in real time, and then the average value is multiplied by −0.5 as the threshold value. The −0.5 value here is an empirical value that can be adjusted according to the requirements of the actual application scenario.

In one embodiment, the related frame parameter information is obtained by performing replication processing on data in the frame parameter information.

In one embodiment, the related frame parameter information is obtained by performing replication processing on data in the frame parameter information. The autocorrelation processing is a correlation operation between the second half of the data and the first half of the data of the sampled data fragment, with a predetermined condition that the result value of the correlation operation conforms to a range of predetermined values. By way of example, the frame parameter information is 01100101, and the related frame parameter information is 01100101 after performing replication processing on the data in the frame parameter information, and the frame parameter field is 0110010101100101 after merging the two. The frame parameter field consists of two identical data fragments.

The autocorrelation processing performed on the sampled data fragments by the receiving end includes: assuming that the length of the frame parameter field is 5 ms, and the 5 ms signal received at the receiving end are $a(1)$, $a(2)$, . . . , $a(n)$ . . . $a(n+n)$. The correlation operation between the second half of the data and the first half of the data of the sampled data fragment is: $s=a(1)*a(n+1)+a(2)*a(n+2)+$ . . . $+a(n)*a(n+n)$. Where $a(1)$, $a(2)$, . . . , $a(n)$ . . . $a(n+n)$ respectively denote the sampled data within the 5 ms signal, and s denotes the result value of the correlation operation. When s is greater than a positive threshold value, then the sampled data fragment is determined as a frame information field and bit synchronization and frame synchronization information is restored. The threshold value and the range of predetermined values are determined as follows:

If the symbol count of 0 and the symbol count of 1 in the frame parameter information are each half, then ideally the signal energy value of the frame parameter field is a constant value, independent of the frame parameter information carried. At this point, the energy value e of a frame parameter field can be obtained in advance. $e=a(1)*a(1)+a(2)*a(2)+$ . . . $+a(n)*a(n)$, and then the energy value e is multiplied by 0.5 as the threshold value for judgment, and then a range of predetermined values is set according to the threshold value. When s is a value within the range of predetermined values, it can be determined that the sampled data fragment conforms to the pattern of consisting of multiple data fragments, and then the sampled data fragment is identified as a frame parameter field. Of course, the average value of the first and second half of energy values of the received 5 ms signal can also be calculated in real time, and then the average value is multiplied by 0.5 as the threshold value. The 0.5 value here is an empirical value that can be adjusted according to the requirements of the actual application scenario.

It should be noted that in other embodiments, the related frame parameter information is obtained in a manner not limited to the four manners described above, but may also be preset information set in advance in the device at the sending end according to actual requirements. As long as the preset information is added to the frame parameter information, and the resulting frame parameter field conforms to the set pattern. In this case, the processing method of the autocorrelation process at the receiving end is determined based on the set pattern of the frame parameter field transmitted in the data stream.

In one embodiment, after the above determining the sampled data fragment as a frame parameter field, the method further includes: obtaining the frame parameter information from the frame parameter field based on the set pattern; performing redundancy decoding on the frame parameter information to obtain frame parameter; determining related information of the payload data based on the frame parameter.

In this embodiment, the frame parameter field is generated by processing the frame parameter information by the sending end and has the set pattern. The receiving end extracts the information from the frame parameter field through the set pattern to obtain the frame parameter information, and then performs redundancy decoding on the frame parameter information to obtain the frame parameter. For example, the receiving end extracts information from the 48 bits frame parameter field to obtain 24 bits frame parameter information, and then performs redundancy decoding on the 24 bits frame parameter information to obtain 3 bits frame parameter. The frame parameters represent related information of the payload data, and the receiving end can obtain the payload data from the data stream based on the frame parameter information, and then obtain the frame structure data based on the payload data and the frame parameters.

In an embodiment, before the above step of obtaining the sampled data fragment from the received data stream, the method further includes: receiving the data stream over a narrowband channel.

In this embodiment, the data stream is received by the receiving end over the narrowband channel. That is, the data processing method for frame synchronization of this embodiment is applied to a narrowband communication system in which the sending end and the receiving end in the narrowband communication system communicate via the narrowband channel. In the narrowband communication system, the data transmission rate of the narrowband channel is low, and the amount of data transmitted per unit time is small. In this embodiment, the sending end provides the frame parameter field with the set pattern, and the receiving end positions the frame parameter field of the frame structure data from the data stream through the set pattern, so as to realize the frame synchronization of the frame structure data, and the data frame transmission process does not need to provide the synchronization word. In this way, it can improve the data transmission efficiency of the sending end, and also improve the efficiency of the receiving end in positioning the start information of the frame structure data, and solve the problems of low data transmission efficiency caused by frame synchronization and low synchronization efficiency of positioning frames under multiple frame synchronization in narrowband communication system.

The data processing method for frame synchronization described in each of the above embodiments is applied to the receiving end of data frame transmission in a communication system. The receiving end positions the frame parameter field from the received data stream through the set pattern to position the start position of the frame structure data, thereby realizing frame synchronization of the frame structure data during data frame transmission. The positioning process does not require the synchronization words, therefore, there is no need to store synchronization words locally and to perform matching identification operations on the synchronization words, which improves the efficiency of positioning the start position of frame structure data.

It should be understood that although the steps in the flowchart are shown sequentially as indicated by the arrows, the steps are not necessarily performed sequentially in the order indicated by the arrows. Except as expressly stated herein, there is no strict sequential limitation on the execution of these steps, and the steps may be executed in other orders. Moreover, at least some of the steps in the accompanying drawings may include multiple sub-steps or multiple stages. These sub-steps or stages can be performed at different times, other than at the same time, and the order in which these sub-steps or stages are performed is not necessarily sequential, but may be performed in turn or alternately with at least some of other steps, or the sub-steps or stages of other steps.

The present application also provides a communication system, which includes a sending end and a receiving end. Wherein, the sending end is the sending end described in the above-described embodiment, and the device at the sending end is shown in FIG. 1. The receiving end is the receiving end as described in the above-described embodiment, and the device of the receiving end is shown in FIG. 7.

Figure 11:
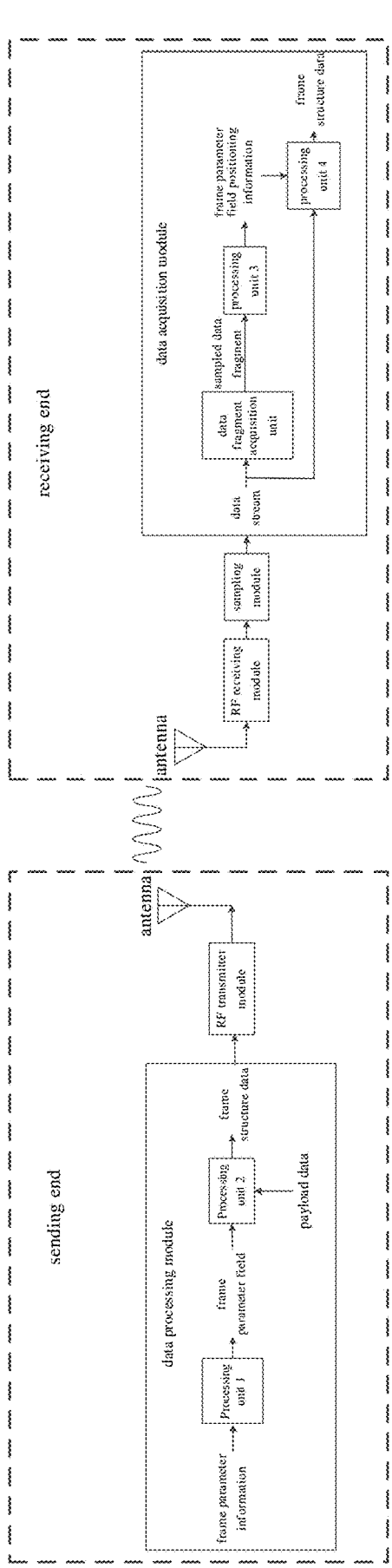
FIG. 11 is a schematic diagram of the composition structure of a communication system according to an embodiment.

In one embodiment, as shown in FIG. 11, the sending end is configured to process frame parameter information, generate frame parameter field with a set pattern, pack the frame parameter field with payload data to obtain frame structure data, and send frame structure data to the receiving end. The receiving end is used to obtain the sampled data fragment from the received data stream, and when the sampled data fragment with the set pattern is detected, the sampled data fragment is determined as a frame parameter field to position the frame parameter field. The receiving end is further configured for obtaining the frame structure data from the data stream based on the frame parameter field.

In this embodiment, the specific process of processing the frame parameter information and obtaining the frame structure data and sending the frame structure data at the sending end can be referred to the description of the embodiments corresponding to FIG. 2 in the above embodiments. The specific process of sampling the received data stream to obtain the sampled data fragments, positioning the frame parameter field, and obtaining the frame structure data at the receiving end can be referred to the description of the embodiments corresponding to FIG. 8 in the above embodiments. The description of the processing at the sending end and the receiving end will not be described in detail here again.

In other embodiments, the processing of the frame structure data at the sending end can be referred to the description of the corresponding embodiments above. The process of positioning the frame parameter field and the process of obtaining the frame structure data on the receiving end can be referred to the description of the corresponding embodiments above, which will not be described in detail here again.

In one embodiment, the communication system is a narrowband communication system wherein the sending end and the receiving end transmit data over a narrowband channel.

In one embodiment, the device at the sending end of the communication system is a walkie-talkie and the device at the receiving end is a walkie-talkie.

Figure 12:
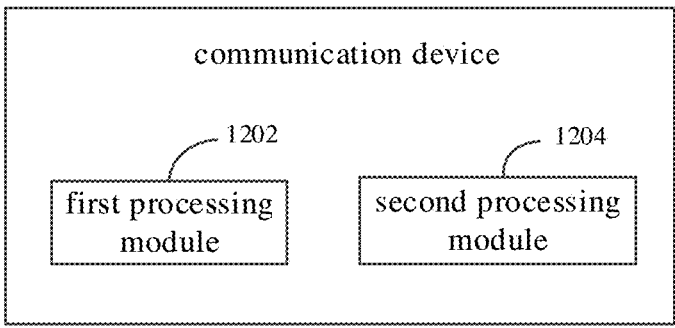
FIG. 12 is a structural block diagram of a communication device according to an embodiment.

The present application also provides a communication device. In one embodiment, as shown in FIG. 12, the device includes a first processing module 1202 and a second processing module 1204. The first processing module 1202 is configured for processing frame parameter information, generating a first frame parameter field with a set pattern, packing the first frame parameter field with payload data to obtain first frame structure data, and sending the first frame structure data to a sending end. The second processing module 1204 is configured for obtaining a sampled data fragment from received data stream, determining the sampled data fragment as a second frame parameter field when the sampled data fragment is detected with the set pattern to position the second frame parameter field, and obtaining second frame structure data from the data stream based on the second frame parameter field.

It should be noted that the communication device in this embodiment is the current communication device, the first frame structure data described above refers to the data in the data frames sent from the current communication device to other communication devices, and the second frame structure data refers to the data in the data frames sent from other communication devices to the current communication device, the difference between the two is only in the name; the first frame parameter field is obtained after processing the frame parameter information in the first frame structure data, and the second frame parameter field is obtained after processing the frame parameter information in the first frame structure data, the difference between the two is only in the name.

In this embodiment, the current communication device integrates the sending function on the data frames and the receiving function on the data frames. The sending function on the data frames includes the processing function on the frame parameter information of the data frames, the packing function on the frame parameter field with the payload data, and the sending function on the frame structure data. The current communication device uses the first processing module 1202 described above to implement the sending function on the data frames. The receiving function on the data frames includes the sampling function on the data stream, the detection function on the sampled data fragments and the acquisition function on the frame structure data, etc. The current communication device uses the above-mentioned second processing module 1204 to implement the receiving function on the data frames.

In one embodiment, the communication device is an intercom device, such as a walkie-talkie.

Figure 13:
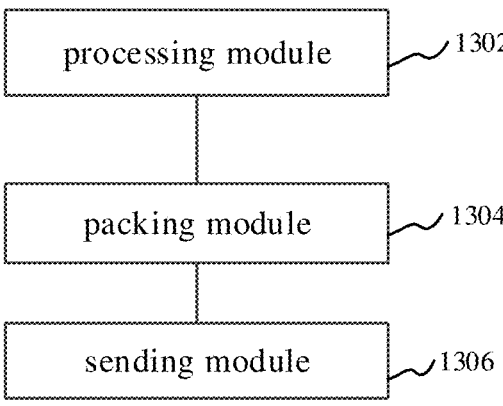
FIG. 13 is a structural block diagram of a data processing device for frame synchronization according to an embodiment.

The present application also provides a data processing device for frame synchronization. In one embodiment, as shown in FIG. 13, the data processing device includes a processing module 1302, a packing module 1304, and a sending module 1306. The processing module 1302 is configured for processing frame parameter information to generate a frame parameter field with a set pattern. The packing module 1304 is configured for packing the frame parameter field with payload data to obtain frame structure data. And the sending module 1306 is configured for sending the frame structure data, wherein the set pattern is used by a receiving end to position the frame parameter field in a received data stream, and subsequently to obtain the frame structure data from the data stream based on the frame parameter field.

In one embodiment, the receiving end identifies the set pattern by performing an autocorrelation processing on the data stream and determines a sampled data fragment with the set pattern in the data stream as the frame parameter field to position the frame parameter field.

In one embodiment, the data processing device for frame synchronization further includes a redundancy processing module for performing redundancy processing on a frame parameter to generate the frame parameter information.

In one embodiment, the length of the frame parameter is smaller than the length of the frame parameter information, and the length of the frame parameter information is smaller than the length of the frame parameter field.

In one embodiment, the frame parameter represents related information of the payload data.

In one embodiment, the sending the frame structure data includes: sending the frame structure data over a narrow-band channel.

In one embodiment, the processing frame parameter information includes: generating related frame parameter information corresponding to the frame parameter information based on the frame parameter information; and merging the frame parameter information with the related frame parameter information.

In one embodiment, the generating related frame parameter information corresponding to the frame parameter information based on the frame parameter information includes: performing a time sequence inversion on data in the frame parameter information to generate the related frame parameter information.

In one embodiment, the generating related frame parameter information corresponding to the frame parameter information based on the frame parameter information includes: performing an inversion operation on data in the frame parameter information, and performing a time sequence inversion on the data after inversion operation to generate the related frame parameter information.

In one embodiment, the generating related frame parameter information corresponding to the frame parameter information based on the frame parameter information includes: performing an inversion operation on data in the frame parameter information to generate the related frame parameter information.

In one embodiment, the generating related frame parameter information corresponding to the frame parameter information based on the frame parameter information includes: performing replication processing on data in the frame parameter information to generate the related frame parameter information.

In one embodiment, the merging the frame parameter information with the related frame parameter information includes: the related frame parameter information is added to the rear or front of the frame parameter information, no symbol interval or symbols with fixed length are arranged between the related frame parameter information and the frame parameter information.

Figure 14:
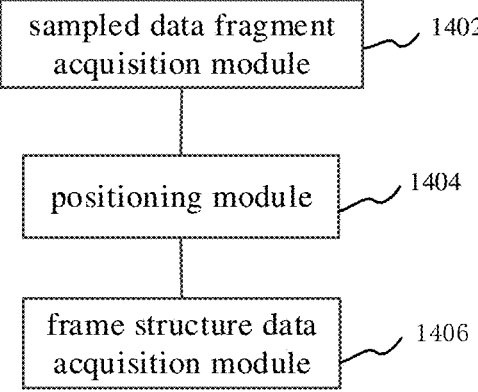
FIG. 14 is a structural block diagram of a data processing device for frame synchronization according to another embodiment.

The present application also provides a data processing device for frame synchronization. In one embodiment, as shown in FIG. 14, the data processing device includes a sampled data fragment acquisition module 1402, a positioning module 1404, and a frame structure data acquisition module 1406. The sampled data fragment acquisition module 1402 is configured for obtaining a sampled data fragment from a received data stream; a positioning module 1404 is configured for determining the sampled data fragment as a frame parameter field to position the frame parameter field when the sampled data fragment is detected with a set pattern, wherein the frame parameter field is generated by processing frame parameter information by a sending end and has the set pattern; a frame structure data acquisition 1406 module is configured for obtaining frame structure data from the data stream according to the frame parameter field, wherein the frame structure data is obtained by the sending end by packing the frame parameter field with payload data.

In one embodiment, a data processing device for frame synchronization further includes a time acquisition module for obtaining a sampled data fragment time of the data stream, wherein the sampled data fragment time is determined according to a data length of the frame parameter field and a transmission rate of data. The step of obtaining a sampled data fragment from a received data stream includes: obtaining the sampled data fragment from the received data stream based on the sampled fragment time.

In one embodiment, the data processing device for frame synchronization further includes a detection module, which is configured for detecting whether the sampled data fragment has the set pattern by performing an autocorrelation processing; determining that the sampled data fragment has the set pattern when processing result of the autocorrelation processing conforms to a predetermined condition; wherein the frame parameter field is generated by merging the frame parameter information and related frame parameter information corresponding to the frame parameter information by the sending end.

In one embodiment, the related frame parameter information is obtained by performing time sequence inversion on data in the frame parameter information.

In one embodiment, the related frame parameter information is obtained by performing a time sequence inversion operation after performing an inversion operation on data in the frame parameter information.

In one embodiment, the related frame parameter information is obtained by performing an inversion operation on data in the frame parameter information.

In one embodiment, the related frame parameter information is obtained by performing replication processing on data in the frame parameter information.

In one embodiment, the data processing device for frame synchronization further includes a decoding module, which is configured for obtaining the frame parameter information from the frame parameter field based on the set pattern; performing redundancy decoding on the frame parameter information to obtain frame parameter; and determining related information of the payload data based on the frame parameter.

In an embodiment, the data processing device for frame synchronization further includes a receiving module for receiving the data stream over a narrowband channel.

The specific limitations of the data processing device for frame synchronization can be referred to the limitations of the data processing method for frame synchronization above and will not be repeated here. The modules of the above devices may be implemented in whole or in part by software, hardware and combinations thereof. Each of the above modules may be embedded in or independent of the processor in the computer device in the form of hardware, or may be stored in the memory of the computer device in the form of software so that the processor can call and execute the operations corresponding to each of the above modules.

Figure 15:
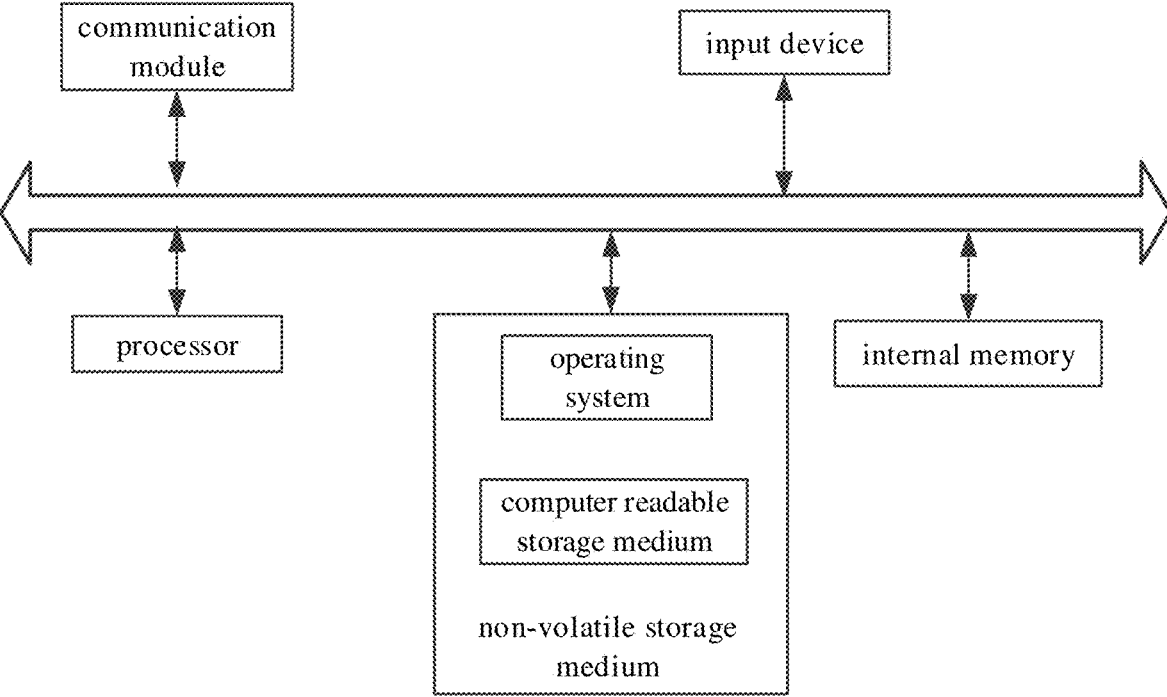
FIG. 15 is an internal structure diagram of a communication apparatus according to an embodiment.

In one embodiment, a communication device is provided, which may be a walkie-talkie, and the internal structure of which may be illustrated in FIG. 15. The communication device is provided with a processor, a non-volatile storage medium, an internal memory, a communication module, and an input device. The communication device receives a data stream of frame structure data from other communication devices or sends frame structure data to other communication devices through the communication module. The communication device receives external input information, such as control information input by a user, through the input device. The host computer implements the data processing method for frame synchronization of the present application, when computer readable instructions stored on the computer readable storage medium of the non-volatile storage medium is executed by the processor.

It should be understood by those skilled in the art that the structure shown in FIG. 15 is only a block diagram of a part of the structure related to the solution of the present application, and does not constitute a limitation to the computer device to which the solution of the present application is applied. A specific computer device may include more or fewer components than shown in the figure, or combine certain components, or have a different component arrangement.

In one embodiment, a communication apparatus is provided, which includes a memory, a processor and computer readable instructions stored on the memory and executable by the processor, wherein the computer readable instructions, when executed by the processor, causing the communication apparatus to perform the following steps: processing frame parameter information to generate a frame parameter field with a set pattern; packing the frame parameter field with payload data to obtain frame structure data; and sending the frame structure data, wherein the set pattern is used by a receiving end to position the frame parameter field in a received data stream, and subsequently to obtain the frame structure data from the data stream based on the frame parameter field.

In one embodiment, the receiving end identifies the set pattern by performing an autocorrelation processing on the data stream and determines a sampled data fragment with the set pattern in the data stream as the frame parameter field to position the frame parameter field.

In one embodiment, when executed by the processor, the computer readable instructions instruct the processor to further perform the following steps: performing a redundancy processing on a frame parameter to generate the frame parameter information.

In one embodiment, the length of the frame parameter is smaller than the length of the frame parameter information, and the length of the frame parameter information is smaller than the length of the frame parameter field.

In one embodiment, the frame parameter represents related information of the payload data.

In one embodiment, when the processor is instructed to perform the step of sending the frame structure data, the processor is instructed to perform the following step specifically: sending the frame structure data over a narrowband channel.

In one embodiment, when the processor is instructed to perform the step of processing frame parameter information, the processor is instructed to perform the following step specifically: generating related frame parameter information corresponding to the frame parameter information based on the frame parameter information; and merging the frame parameter information with the related frame parameter information.

In one embodiment, when the processor is instructed to perform the step of generating related frame parameter information corresponding to the frame parameter information based on the frame parameter information, the processor is instructed to perform the following step specifically: performing a time sequence inversion on data in the frame parameter information to generate the related frame parameter information.

In one embodiment, when the processor is instructed to perform the step of generating related frame parameter information corresponding to the frame parameter information based on the frame parameter information, the processor is instructed to perform the following step specifically: performing an inversion operation on data in the frame parameter information, and performing a time sequence inversion on the data after inversion operation to generate the related frame parameter information.

In one embodiment, when the processor is instructed to perform the step of generating related frame parameter information corresponding to the frame parameter information based on the frame parameter information, the processor is instructed to perform the following step specifically: performing an inversion operation on data in the frame parameter information to generate the related frame parameter information.

In one embodiment, when the processor is instructed to perform the step of generating related frame parameter information corresponding to the frame parameter information based on the frame parameter information, the processor is instructed to perform the following step specifically: performing replication processing on data in the frame parameter information to generate the related frame parameter information.

In one embodiment, when the processor is instructed to perform the step of merging the frame parameter information with the related frame parameter information, the processor is instructed to perform the following step specifically: the related frame parameter information is added to the rear or front of the frame parameter information, no symbol interval or symbols with fixed length are arranged between the related frame parameter information and the frame parameter information.

In one embodiment, a communication apparatus is provided, which includes a memory, a processor and computer readable instructions stored on the memory and executable by the processor, wherein the computer readable instructions, when executed by the processor, instructing the processor to perform the following steps: obtaining a sampled data fragment from a received data stream; determining the sampled data fragment as a frame parameter field to position the frame parameter field when the sampled data fragment is detected with a set pattern, wherein the frame parameter field is generated by processing frame parameter information by a sending end and has the set pattern; obtaining frame structure data from the data stream based on the frame parameter field, wherein the frame structure data is obtained by the sending end by packing the frame parameter field with payload data.

In one embodiment, when executed by the processor, the computer readable instructions instruct the processor to further perform the following steps: obtaining a sampled data fragment time of the data stream, wherein the sampled data fragment time is determined according to a data length of the frame parameter field and a transmission rate of data; When the processor is instructed to perform the step of obtaining a sampled data fragment from a received data stream, the processor performs the following step specifically: obtaining the sampled data fragment from the received data stream based on the sampled data fragment time.

In one embodiment, when executed by the processor, the computer readable instructions instruct the processor to further perform the following steps: detecting whether the sampled data fragment has the set pattern by performing an autocorrelation processing; determining that the sampled data fragment has the set pattern when processing result of the autocorrelation processing conforms to a predetermined condition; wherein the frame parameter field is generated by merging the frame parameter information and related frame parameter information corresponding to the frame parameter information by the sending end.

In one embodiment, the related frame parameter information is obtained by performing time sequence inversion on data in the frame parameter information.

In one embodiment, the related frame parameter information is obtained by performing a time sequence inversion operation after performing an inversion operation on data in the frame parameter information.

In one embodiment, the related frame parameter information is obtained by performing an inversion operation on data in the frame parameter information.

In one embodiment, the related frame parameter information is obtained by performing replication processing on data in the frame parameter information.

In one embodiment, when executed by the processor, the computer readable instructions instruct the processor to further perform the following steps: obtaining the frame parameter information from the frame parameter field based on the set pattern; performing redundancy decoding on the frame parameter information to obtain frame parameter; determining related information of the payload data based on the frame parameter.

In one embodiment, when executed by the processor, the computer readable instructions instruct the communication apparatus to further perform the following steps: receiving the data stream over a narrowband channel.

In one embodiment, a computer readable storage medium is provided, on which computer readable instructions is stored, when executed by a processor, the computer readable instructions instruct the processor to perform the following steps: processing frame parameter information to generate a frame parameter field with a set pattern; packing the frame parameter field with payload data to obtain frame structure data; and sending the frame structure data, wherein the set pattern is used by a receiving end to position the frame parameter field in a received data stream, and subsequently to obtain the frame structure data from the data stream based on the frame parameter field.

In one embodiment, the receiving end identifies the set pattern by performing an autocorrelation processing on the data stream and determines a sampled data fragment with the set pattern in the data stream as the frame parameter field to position the frame parameter field.

In one embodiment, when executed by the processor, the computer readable instructions instruct the processor to further perform the following steps: performing a redundancy processing on a frame parameter to generate the frame parameter information.

In one embodiment, the length of the frame parameter is smaller than the length of the frame parameter information, and the length of the frame parameter information is smaller than the length of the frame parameter field.

In one embodiment, the frame parameter represents related information of the payload data.

In one embodiment, when the processor is instructed to perform the step of sending the frame structure data, the processor is instructed to perform the following step specifically: sending the frame structure data over a narrowband channel.

In one embodiment, when the processor is instructed to perform the step of processing frame parameter information, the processor is instructed to perform the following step specifically: generating related frame parameter information corresponding to the frame parameter information based on the frame parameter information; and merging the frame parameter information with the related frame parameter information.

In one embodiment, when the processor is instructed to perform the step of generating related frame parameter information corresponding to the frame parameter information based on the frame parameter information, the processor is instructed to perform the following step specifically: performing a time sequence inversion on data in the frame parameter information to generate the related frame parameter information.

In one embodiment, when the processor is instructed to perform the step of generating related frame parameter information corresponding to the frame parameter information based on the frame parameter information, the processor is instructed to perform the following step specifically: performing an inversion operation on data in the frame parameter information, and performing a time sequence inversion on the data after inversion operation to generate the related frame parameter information.

In one embodiment, when the processor is instructed to perform the step of generating related frame parameter information corresponding to the frame parameter information based on the frame parameter information, the processor is instructed to perform the following step specifically: performing an inversion operation on data in the frame parameter information to generate the related frame parameter information.

In one embodiment, when the processor is instructed to perform the step of generating related frame parameter information corresponding to the frame parameter information based on the frame parameter information, the processor is instructed to perform the following step specifically: performing replication processing on data in the frame parameter information to generate the related frame parameter information.

In one embodiment, when the processor is instructed to perform the step of merging the frame parameter information with the related frame parameter information, the processor is instructed to perform the following step specifically: the related frame parameter information is added to the rear or front of the frame parameter information, no symbol interval or symbols with fixed length are arranged between the related frame parameter information and the frame parameter information.

In one embodiment, a computer readable storage medium is provided, on which computer readable instructions is stored, when executed by a processor, the computer readable instructions instruct the processor to perform the following steps: obtaining a sampled data fragment from a received data stream; determining the sampled data fragment as a frame parameter field to position the frame parameter field when the sampled data fragment is detected with a set pattern, wherein the frame parameter field is generated by processing frame parameter information by a sending end and has the set pattern; obtaining frame structure data from the data stream based on the frame parameter field, wherein the frame structure data is obtained by the sending end by packing the frame parameter field with payload data.

In one embodiment, when executed by the processor, the computer readable instructions instruct the processor to further perform the following steps: obtaining a sampled data fragment time of the data stream, wherein the sampled data fragment time is determined according to a data length of the frame parameter field and a transmission rate of data; when the processor is instructed to perform the step of obtaining a sampled data fragment from a received data stream, the processor performs the following step specifically: obtaining the sampled data fragment from the received data stream based on the sampled data fragment time.

In one embodiment, when executed by the processor, the computer readable instructions instruct the processor to further perform the following steps: detecting whether the sampled data fragment has the set pattern by performing an autocorrelation processing; determining that the sampled data fragment has the set pattern when processing result of the autocorrelation processing conforms to a predetermined condition; wherein the frame parameter field is generated by merging the frame parameter information and related frame parameter information corresponding to the frame parameter information by the sending end.

In one embodiment, the related frame parameter information is obtained by performing time sequence inversion on data in the frame parameter information.

In one embodiment, the related frame parameter information is obtained by performing a time sequence inversion operation after performing an inversion operation on data in the frame parameter information.

In one embodiment, the related frame parameter information is obtained by performing an inversion operation on data in the frame parameter information.

In one embodiment, the related frame parameter information is obtained by performing replication processing on data in the frame parameter information.

In one embodiment, when executed by the processor, the computer readable instructions instruct the processor to further perform the following steps: obtaining the frame parameter information from the frame parameter field based on the set pattern; performing redundancy decoding on the frame parameter information to obtain frame parameter; determining related information of the payload data based on the frame parameter.

In one embodiment, when executed by the processor, the computer readable instructions instruct the communication apparatus to further perform the following steps: receiving the data stream over a narrowband channel.

Those skilled in the art will appreciate that all or part of the processes in the methods of the above-mentioned embodiments can be completed by instructing relevant hardware through computer readable instructions or computer program, and the computer readable instructions or computer program may be stored in a non-volatile computer readable storage medium which, when executed, may cause a processor to perform the processes of the embodiments of the methods described above. Any reference to memory, storage, database, or other media used in the various embodiments provided in the present application may include non-volatile and/or volatile memory. The non-volatile memory may include Read-only Memory (ROM), Programmable ROM (PROM), Electrically Programmable ROM (EPROM), Electrically Erasable Programmable ROM (EEPROM), or flash memory. The volatile memory may include Random Access Memory (RAM) or external cache memory. By way of illustration and not limitation, RAM is available in a variety of forms, such as Static RAM (SRAM), Dynamic RAM (DRAM), Synchronous DRAM (SDRAM), Double data rate SDRAM (DDRSDRAM), Enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM), etc.

The respective technical features of the above embodiments can be merged arbitrarily, and for the conciseness of the description, not all possible combinations of each technical feature of the above embodiments have been described; however, as long as the combinations of these technical features are not contradictory, they should be considered to be within the scope of disclosure of the present description.

The above embodiments merely express several embodiments of the present application, and the description thereof is more relatively specific and detailed, but should not be construed as limiting the scope of the present invention. It should be noted that, for a person of ordinary skill in the art, several modifications and improvements can also be made without departing from the concept of the present application, which all fall within the scope of protection of the present application. Therefore, the scope of protection of the present application shall be subject to the appended claims.

What is claimed is:

1. A data processing method for frame synchronization, comprising:

generating related frame parameter information corresponding to frame parameter information based on the frame parameter information and merging the frame parameter information with the related frame parameter information to generate a frame parameter field with a set pattern;

packing the frame parameter field with payload data to obtain frame structure data; and sending the frame structure data, wherein the set pattern is used by a receiving end to identify the set pattern by performing an autocorrelation processing on a data stream, and the receiving end determines a sampled data fragment with the set pattern in the data stream as the frame parameter field to position the frame parameter field, on the frame parameter field; wherein, the autocorrelation processing comprises:

instructing the receiving end to collect data fragments in the data stream, perform specified processing on the data fragments, conduct correlation detection of unprocessed data fragments and processed data fragments, and determine whether the data fragments conform to the set pattern based on detection results.

2. The data processing method according to claim 1, further comprises:
performing a redundancy processing on a frame parameter to generate the frame parameter information.

3. The data processing method according to claim 2, wherein, a length of the frame parameter is smaller than a length of the frame parameter information, and the length of the frame parameter information is smaller than a length of the frame parameter field.

4. The data processing method according to claim 2, wherein, the frame parameter represents related information of the payload data.

5. The data processing method according to claim 1, wherein, the sending the frame structure data comprises:
sending the frame structure data over a narrowband channel.

6. The data processing method according to claim 1, wherein, the generating related frame parameter information corresponding to the frame parameter information based on the frame parameter information comprises:
performing a time sequence inversion on data in the frame parameter information to generate the related frame parameter information.

7. The data processing method according to claim 1, wherein, the generating related frame parameter information corresponding to the frame parameter information based on the frame parameter information comprises:
performing an inversion operation on data in the frame parameter information, and performing a time sequence inversion on the data after inversion operation to generate the related frame parameter information.

8. The data processing method according to claim 1, wherein, the generating related frame parameter information corresponding to the frame parameter information based on the frame parameter information comprises:
performing an inversion operation on data in the frame parameter information to generate the related frame parameter information.

9. The data processing method according to claim 1, wherein, the generating related frame parameter information corresponding to the frame parameter information based on the frame parameter information comprises:
performing a replication processing on data in the frame parameter information to generate the related frame parameter information.

10. The data processing method according to claim 1, wherein, the merging the frame parameter information with the related frame parameter information comprises: the related frame parameter information is added to the rear or front of the frame parameter information, wherein no symbol interval or symbols with fixed length are arranged between the related frame parameter information and the frame parameter information.

11. A communication apparatus comprising a memory, a processor and computer readable instructions stored on the memory and executable by the processor, wherein, when executed by the processor, the computer readable instructions are configured to instruct the processor to perform the method according to claim 1.

12. A non-transitory computer readable storage medium on which computer readable instructions is stored, wherein, when executed by a processor, the computer readable instructions are configured to instruct the processor to perform the method according to claim 1.

13. A data processing method for frame synchronization, comprising:
obtaining a sampled data fragment from a received data stream;
detecting whether the sampled data fragment has a set pattern by performing an autocorrelation processing;
determining that the sampled data fragment has the set pattern when a processing result of the autocorrelation processing meets a predetermined condition, and determining that the sampled data fragment is a frame parameter field, to position the frame parameter field, wherein the frame parameter field is generated by merging the frame parameter information and related frame parameter information corresponding to the frame parameter information by a sending end and has the set pattern; and
the frame structure data is obtained from the data stream according to the frame parameter field, wherein the frame structure data is obtained by the sending end by packing the frame parameter field with payload data;
wherein, the autocorrelation processing comprises:
instructing the receiving end to collect data fragments in the data stream, perform specified processing on the data fragments, conduct correlation detection of unprocessed data fragments and processed data fragments, and determine whether the data fragments conform to the set pattern based on detection results.

14. The data processing method according to claim 13, further comprises:
obtaining a sampled data fragment time of the data stream, wherein the sampled data fragment time is determined according to a data length of the frame parameter field and a transmission rate of data; and
the obtaining a sampled data fragment from a received data stream comprises:
obtaining the sampled data fragment from the received data stream based on the sampled data fragment time.

15. The data processing method according to claim 13, wherein, the related frame parameter information is obtained by performing time sequence inversion on data in the frame parameter information.

16. The data processing method according to claim 13, wherein, the related frame parameter information is obtained by performing a time sequence inversion operation after performing an inversion operation on data in the frame parameter information.

17. The data processing method according to claim 13, wherein, the related frame parameter information is obtained by performing an inversion operation on data in the frame parameter information.

18. The data processing method according to claim 13, wherein, the related frame parameter information is obtained by performing a replication processing on data in the frame parameter information.

19. The data processing method according to claim 13, wherein, after determining the sampled data fragment as a frame parameter field, the data processing method further comprises:
obtaining the frame parameter information from the frame parameter field based on the set pattern;
performing redundancy decoding on the frame parameter information to obtain frame parameter; and determining related information of the payload data based on the frame parameter.

20. The data processing method according to claim 13, further comprises:

receiving the data stream over a narrowband channel.

21. A communication system, including a sending end and a receiving end; wherein, a device at the sending end of the communication system is a walkie-talkie and a device at the receiving end is a walkie-talkie;

the walkie-talkie of the sending end comprising a memory, a processor and computer readable instructions stored on the memory and executable by the processor, when executed by the processor, the computer readable instructions instruct the processor to:

generate related frame parameter information corresponding to frame parameter information based on the frame parameter information, and merge the frame parameter information with the related frame parameter information to generate a frame parameter field with a set pattern;

pack the frame parameter field with payload data to obtain frame structure data; and send the frame structure data, wherein the set pattern is used by a receiving end to position the frame parameter field in a received data stream, and subsequently to obtain the frame structure data from the data stream based on the frame parameter field;

the walkie-talkie of the receiving end comprising a memory, a processor and computer readable instructions stored on the memory and executable by the processor, when executed by the processor, the computer readable instructions instruct the processor to:

obtain a sampled data fragment from a received data stream;

detect whether the sampled data fragment has the set pattern by performing an autocorrelation processing;

determine that the sampled data fragment has the set pattern when a processing result of the autocorrelation processing meets a predetermined condition, and determine that the sampled data fragment is a frame parameter field, to position the frame parameter field; and wherein the frame structure data is obtained from the data stream according to the frame parameter field, wherein the frame structure data is obtained by the sending end by packing the frame parameter field with payload data;

wherein, the autocorrelation processing comprises:

instructing the receiving end to collect data fragments in the data stream, perform specified processing on the data fragments, conduct correlation detection of unprocessed data fragments and processed data fragments, and determine whether the data fragments conform to the set pattern based on detection results.

22. A communication apparatus comprising a memory, a processor and computer readable instructions stored on the memory and executable by the processor, wherein, when executed by the processor, the computer readable instructions are configured to instruct the processor to perform the method according to claim 13.

23. A non-transitory computer readable storage medium on which computer readable instructions is stored, wherein, when executed by a processor, the computer readable instructions are configured to instruct the processor to perform the method according to claim 13.

* * * * *